(12) United States Patent
Bell et al.

(10) Patent No.: US 11,187,351 B2
(45) Date of Patent: Nov. 30, 2021

(54) STAND-OFF CLAMP CABLE MOUNTING SYSTEM

(71) Applicant: ConcealFab Corporation, Colorado Springs, CO (US)

(72) Inventors: Thomas Bell, Colorado Springs, CO (US); Steve Rogers, Colorado Springs, CO (US); William Pounds, Colorado Springs, CO (US); Jacob Lovelady, Colorado Springs, CO (US)

(73) Assignee: ConcealFab Corporation, Colorado Springs, CO (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 17/128,029

(22) Filed: Dec. 19, 2020

(65) Prior Publication Data
US 2021/0190237 A1    Jun. 24, 2021

Related U.S. Application Data

(60) Provisional application No. 62/951,731, filed on Dec. 20, 2019.

(51) Int. Cl.
*F16L 3/00* (2006.01)
*F16L 3/06* (2006.01)
*H02G 3/04* (2006.01)

(52) U.S. Cl.
CPC .............. *F16L 3/06* (2013.01); *H02G 3/0437* (2013.01)

(58) Field of Classification Search
None
See application file for complete search history.

(56) References Cited

U.S. PATENT DOCUMENTS 2,663,531 A    12/1952    Rubano
3,012,750 A    12/1961    Schermerhorn
(Continued)

FOREIGN PATENT DOCUMENTS

CN    201503908 U    6/2010
CN    204834825 U    12/2015
(Continued)

OTHER PUBLICATIONS

ConcealFab Corporation, "Interference Mitigation Solutions" catalog, Jan. 7, 2019.
(Continued)

*Primary Examiner* — Steven M Marsh
(74) *Attorney, Agent, or Firm* — Mehrman Law Office; Michael J. Mehrman

(57) ABSTRACT

A stand-off clamp cable mounting assembly includes a cable hanger mounting plate attached to extended threaded rods that also secure the clamp to a support structure. Attaching the mounting plate directly to the extended threaded rods of the clamp allows a wide range of cable hanger configurations to be created with a minimal number of parts. For example, alternative embodiments can be created by varying the stand-off distance, the alignment between the cable hanger mounting plate and the clamp, and the length of the cable hanger mounting plate. Additional embodiments can be created by attaching two cable hanger mounting plates to the same extended threaded rods on opposing sides of the clamp. Cable hanger mounting plates can be formed from flat plates as well as a variety of channels, such as channels with "C", "Z", "U", and "comb" shaped end profiles.

20 Claims, 19 Drawing Sheets

(56) References Cited

U.S. PATENT DOCUMENTS

| | | | |
|---|---|---|---|
| 4,595,185 A | 6/1986 | Kitagawa | |
| 4,645,867 A * | 2/1987 | Annas | H02G 7/056 174/79 |
| 4,784,552 A | 11/1988 | Rebentisch et al. | |
| 5,794,897 A | 8/1998 | Jobin et al. | |
| 6,354,543 B1 | 3/2002 | Paske | |
| 6,443,402 B1 | 9/2002 | Ferrill et al. | |
| 6,502,796 B1 | 1/2003 | Wales | |
| 6,609,343 B1 * | 8/2003 | Litten | A63B 71/023 248/228.5 |
| 6,622,976 B1 | 9/2003 | Ianello | |
| 6,899,305 B2 | 3/2005 | Korczak et al. | |
| 7,293,745 B2 | 11/2007 | Catapano | |
| 7,770,341 B2 * | 8/2010 | Fox | H02G 3/32 52/220.2 |
| 7,845,597 B2 * | 12/2010 | Gatta | B60R 11/00 248/58 |
| 8,011,621 B2 | 9/2011 | Korczak | |
| 8,191,836 B2 | 6/2012 | Korzak | |
| 8,439,316 B2 | 5/2013 | Feige | |
| 9,000,299 B2 * | 4/2015 | Ruth | H02G 3/32 174/72 A |
| 9,086,175 B2 | 7/2015 | Feige | |
| 9,219,461 B2 | 12/2015 | Zimmerman | |
| 9,543,635 B2 | 1/2017 | Schulz et al. | |
| 9,853,434 B2 | 12/2017 | Vaccaro | |
| 9,866,004 B2 | 1/2018 | Vaccaro | |
| 9,903,510 B2 | 2/2018 | Joshi et al. | |
| 9,995,414 B2 | 6/2018 | Joshi et al. | |
| 10,158,218 B2 | 12/2018 | Vaccaro et al. | |
| 10,243,339 B2 | 3/2019 | Vaccaro et al. | |
| 10,253,906 B2 | 4/2019 | Vaccaro | |
| 10,411,339 B2 | 9/2019 | Cashion et al. | |
| 10,422,446 B2 | 9/2019 | Joshi et al. | |
| 2002/0005463 A1 | 1/2002 | Paske et al. | |
| 2002/0066833 A1 | 6/2002 | Ferrill et al. | |
| 2004/0119655 A1 * | 6/2004 | Hunt | H01Q 1/125 343/878 |
| 2005/0023421 A1 | 2/2005 | Wood et al. | |
| 2009/0294602 A1 | 12/2009 | Korczak | |
| 2011/0186693 A1 | 8/2011 | McMiles et al. | |
| 2011/0226913 A1 | 9/2011 | Feige | |
| 2014/0086704 A1 | 3/2014 | Hemingway et al. | |
| 2017/0122460 A1 | 5/2017 | Joshi et al. | |
| 2017/0264005 A1 | 9/2017 | Roy et al. | |
| 2018/0138678 A1 | 5/2018 | Vacarro et al. | |
| 2018/0152253 A1 | 5/2018 | Bell et al. | |
| 2019/0003616 A1 | 1/2019 | Wargo | |
| 2019/0203878 A1 | 7/2019 | Deng et al. | |
| 2019/0267696 A1 | 8/2019 | Stekr et al. | |

FOREIGN PATENT DOCUMENTS

| | | |
|---|---|---|
| CN | 108174465 A | 6/2018 |
| EP | 2309832 B1 | 12/2014 |
| WO | 2018048624 A1 | 3/2018 |

OTHER PUBLICATIONS

ATT, "C&E Mobility Policy (Standard)" Version 13, Jan. 29, 2019.
Rosenberger Site Solutions, LLC, "Product Installation D-SSAN2700" data sheet, May 17, 2019, published by.
ATT, "C&E Mobility Policy (Standard)" Version 18, Jun. 14, 2019.
Declaration of Thomas Bell Under 37 CFR 1.130.
SitePro1 a Valmont Company (website), https://www.sitepro1.com/store/cart.php?m=product_list&c=1, Oct. 21, 2006.
Petrilla Technologies, LLC (website), https://petrillatechnologies.com/support-accessories.html, Mar. 24, 2017.
CommScope (website), https://www.commscope.com/catalog/tools_accessories/product aspx?id=46, Oct. 28, 2012.
FIMO, "Product Data Sheet, BAP 10, Plastic Socle for BFI 10 Threaded Bars" Apr. 13, 2016 (and associated photograph).
Kathrein, Kathrein Heavy Dual Panel Mounting Kit, Solid Signal, Signal Group LLC & Affiliates.
Alliance Corporation, Universal RRU Mount.

* cited by examiner

70A
First Example
Cable Hanger

70B
Second Example
Cable Hanger

70C
Third Example
Cable Hanger

70D
Fourth Example
Cable Hanger (Top View)

(End View)

(End View)

(End View)

(End View)

170
Stand-Off Clamp
Cable Mounting System

171

Supply of Clamp Brackets

172

Assortment of Threaded Rods
of various lengths

173

Assortment of Cable Hanger Mounting
Plates of various lengths

174

Supply of Attachment Hardware
(e.g., nuts, washers, lock washers)

175

Supply of Cable Hangers

STAND-OFF CLAMP CABLE MOUNTING SYSTEM

REFERENCE TO RELATED APPLICATIONS

This application claims priority to U.S. Provisional Patent Application Ser. No. 62/951,731 filed Dec. 20, 2019, which is incorporated by reference.

TECHNICAL FIELD

The present invention is directed to cellular communication systems and, more particularly, to a stand-off clamp cable mounting system for organizing and securing cables at cellular telephone base station antenna sites, which can be easily adapted to provide a wide variety of cable support configurations with a minimum number of parts.

BACKGROUND

An essential element of modern mobile communications systems is the "cell site." The cell site includes one or more cellular base station antennas aimed at a desired geographical area of coverage with coaxial cables connecting the antennas to base station radio equipment. The performance of a cell site is often limited by passive intermodulation ("PIM") interference. PIM interference occurs when the high-power downlink signals (the "main beam") transmitted by the base station antenna mixes at passive, non-linear junctions in the RF path, creating new signals. When these new signals (intermodulation products) fall in an antenna's uplink band, they act as interference and reduce the signal-to-interference-plus-noise ratio ("SINR"). As the SINR reduces, the geographic coverage of the cell site reduces and the data capacity of that cell site reduces.

It is well documented that loosely touching metal-to-metal surfaces can behave in a non-linear fashion and become sources of passive intermodulation when illuminated by high power RF signals. Recently, it has been determined that loose metal-to-metal connections located behind base station antennas are also able to generate high levels of passive intermodulation. Even though this region is well outside the main beam of the antenna, enough RF energy is present in this region to excite non-linear objects and generate PIM.

Metal brackets and associated hardware for supporting RF, optical, ground and remote electrical tilt ("RET") cable are common sources of loose metal-to-metal contact found in the region behind and close to base station antennas. These cables are secured by cable hangers spaced along their length to the antenna support frame to prevent the cables from moving in the wind. Antenna support frames are often constructed using structural steel supports and metal cable hangers are often used to secure the cables to the frame.

Cellular telephone base stations often utilize 6-channel or 12-channel antennas, where each channel has a respective RF cable feeding the antenna. Additional cables may feed the antenna, such as a RET cable, an optical fiber, and so forth. A typical base station antenna may therefore have 6 to 14 cables feeding the antenna. Each of these cables is typically secured to a support structure within 18 inches from the antenna, and then every three feet along the length of the cable. In many cases, the cables loop to other pieces of equipment, such as radios, controllers, and so forth, which may be located in fairly close proximity to the antenna. In a mast-mounted base station, for example, the antennas, radios and controllers are typically mounted to the same mast within a few feet of each other. This requires tight cable routing configurations with demanding cable support requirements.

FIGS. 1-5 illustrate conventional cable hanger assemblies for securing RF cables at base station antenna sites. FIG. 1 (prior art) depicts a two-channel cable hanger assembly 10 that includes a pipe clamp 11 supporting two cable hanger channels 12a and 12b. Each channel includes a number of cable hanger receptacle holes represented by the enumerated cable hanger receptacle hole 13. FIG. 2 (prior art) depicts a band clamp cable hanger assembly 20 that includes a band clamp 21, a bracket 22, a threaded rod 23, and a cable hanger channel 24 that includes a number of cable hanger receptacle holes represented by the enumerated cable hanger receptacle hole 25. FIG. 3 (prior art) depicts a two-flange cable hanger assembly 30 that includes a mast 31, a pipe clamp 32, and a pair of cable hanger flanges 33a and 33b that include a number of cable hanger receptacle holes represented by the enumerated cable hanger receptacle hole 34. FIG. 4 (prior art) depicts an extension bar cable hanger assembly 40, which includes a version of the two-flange cable hanger 30 shown in FIG. 3 modified to include an additional extension bar 41. The extension bar 41 includes a number of cable hanger receptacle holes represented by the enumerated cable hanger receptacle hole 42. FIG. 5A (prior art) depicts a single-channel cable hanger assembly 50A that includes a pipe clamp 51 attached to a cable hanger channel 52 The channel 52 includes a number of cable hanger receptacle holes represented by the enumerated cable hanger receptacle hole 53. FIG. 5B (prior art) depicts single-plate channel cable hanger assembly 50B that includes a pipe clamp 51 and a cable hanger plate 54 that includes a number of cable hanger receptacle holes represented by the enumerated cable hanger receptacle hole 55.

Each of these conventional cable hanger assemblies includes a pipe clamp that secures a cable hanger channel, flange or plate to a support structure, such as a mast. The mast is usually a round metal pipe but other types of support structures, such as square metal pipes and angle bars, are commonly used in the industry. A technician typically positions a cable hanger around one of the antenna cables and then snaps the cable hanger into a cable receptacle hole of a cable hanger channel, flange or plate to secure the cable to the cable hanger. Each of the conventional cable hanger assemblies is designed to secure multiple cables to the support structure.

These conventional cable hanger assemblies have fixed configurations requiring the technician to carry a variety of different cable hanger assemblies to meet the different cable support configurations for different base stations. While each cable hanger assembly includes a number of cable hanger receptacle holes providing some degree of flexibility in the available cable support configurations, they are not easily adapted to a wider range of cable support configurations. The conventional cable hanger assemblies also provide limited options for supporting multiple cables in tight and looping cable routing configurations. A need therefore exists for a more flexible cable mounting system that can be readily adapted to wider range of cable support configurations.

SUMMARY

The needs described above are met by a stand-off clamp cable mounting system for organizing and securing cables at cellular telephone base station antenna sites. A stand-off clamp cable mounting assembly includes a cable hanger mounting plate attached to extended threaded rods that also secure the clamp to a support structure. Attaching the cable hanger mounting plate directly to the extended threaded rods of the clamp allows a wide range of cable hanger configurations to be created with a minimal number of parts. For example, alternative embodiments can be created by varying the stand-off distance between the cable hanger mounting plate and support structure, the alignment between the cable hanger mounting plate and the clamp, and the length of the cable hanger mounting plate. Additional embodiments can be created by attaching two cable hanger mounting place to the same extended threaded rods on opposing sides of the clamp. Cable hanger mounting plates can be formed from flat plates as well as a variety of channels, such as channels with "C", "Z", "U", and "comb" shaped end profiles.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Figure 1:
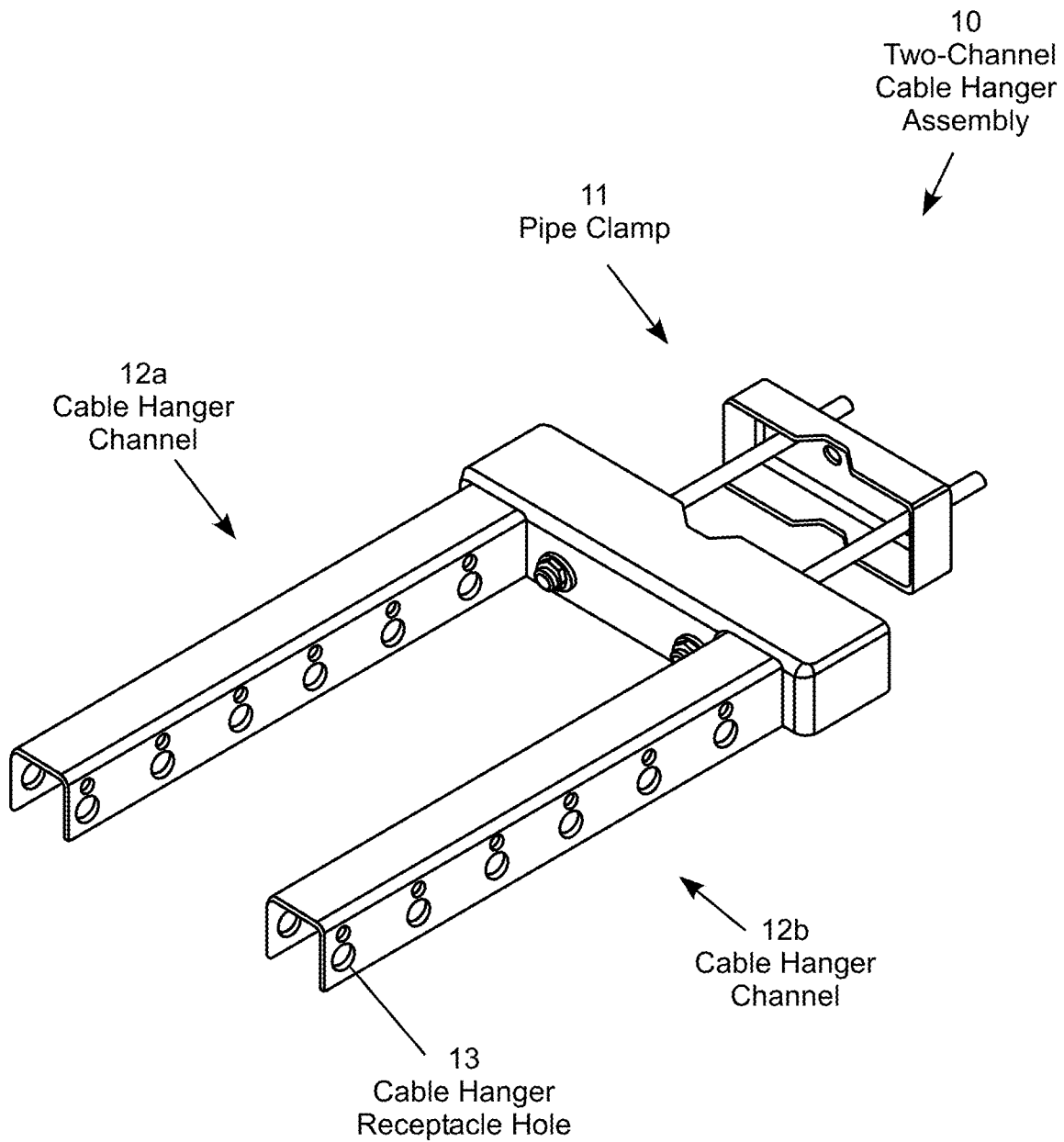
FIG. 1 (prior art) is a perspective view of a conventional two-channel cable hanger assembly.
Figure 2:
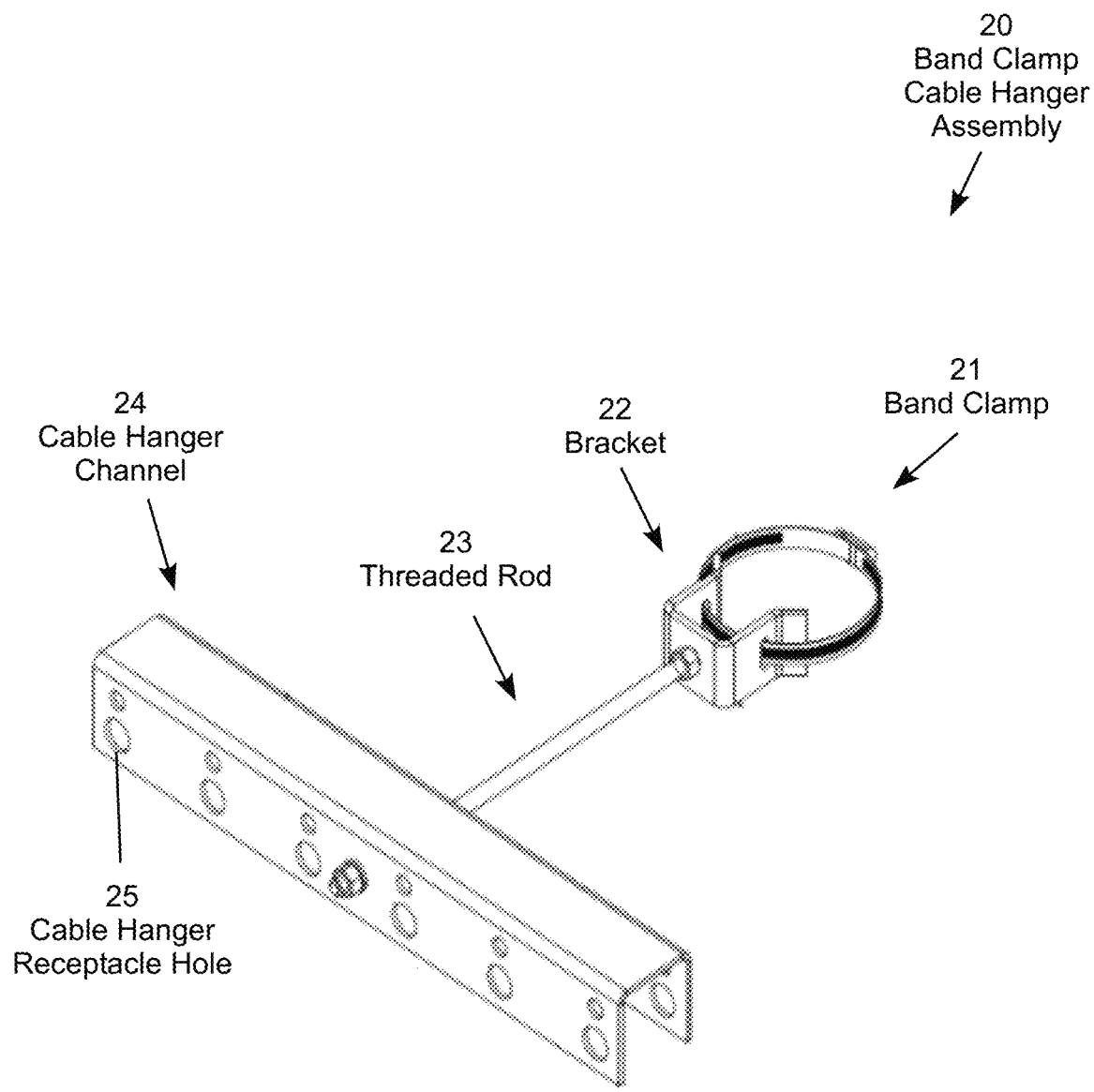
FIG. 2 (prior art) is a perspective view of a conventional band clamp cable hanger assembly.
Figure 3:
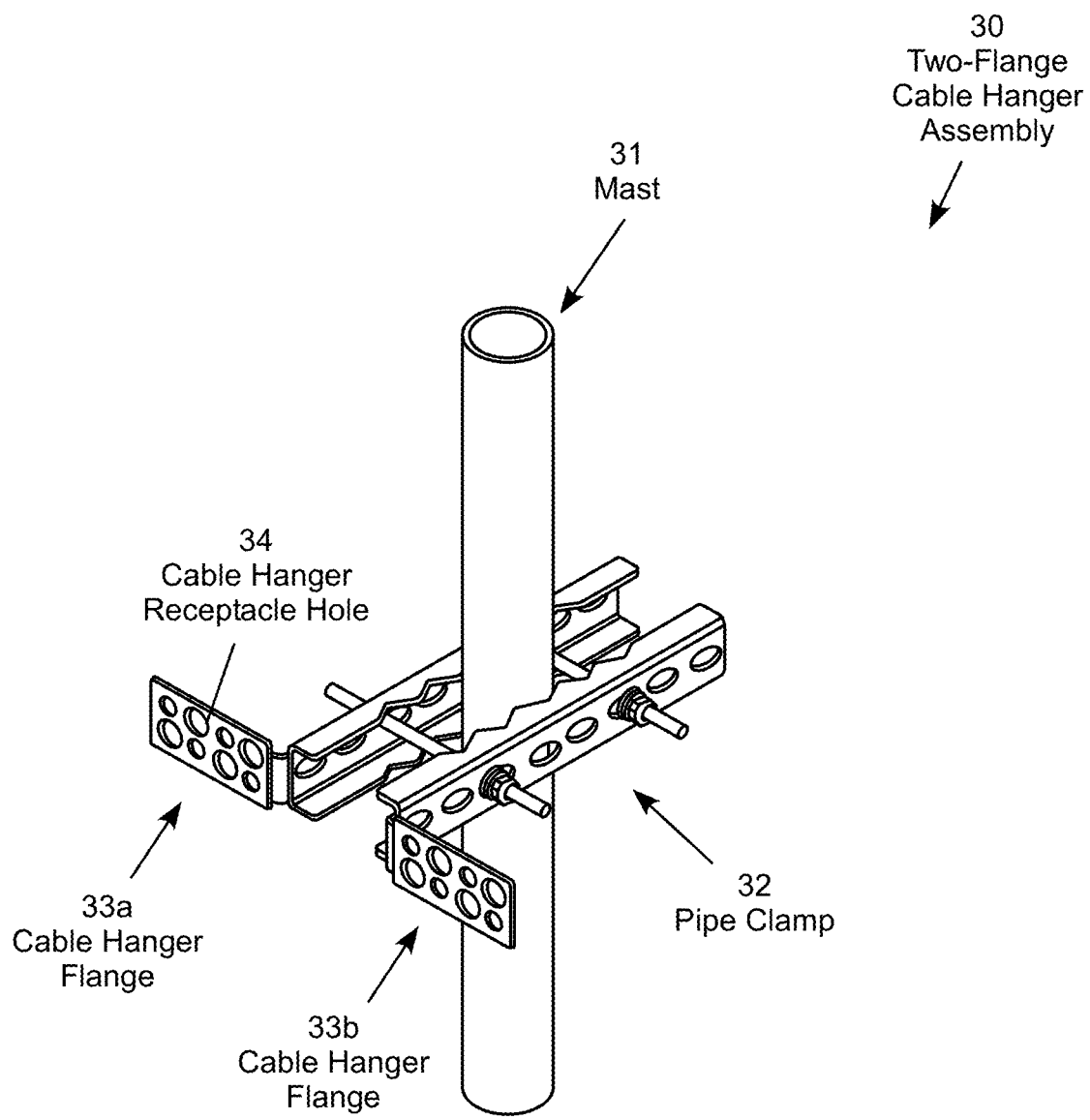
FIG. 3 (prior art) is a perspective view of a conventional two-flange cable hanger assembly.
Figure 4:
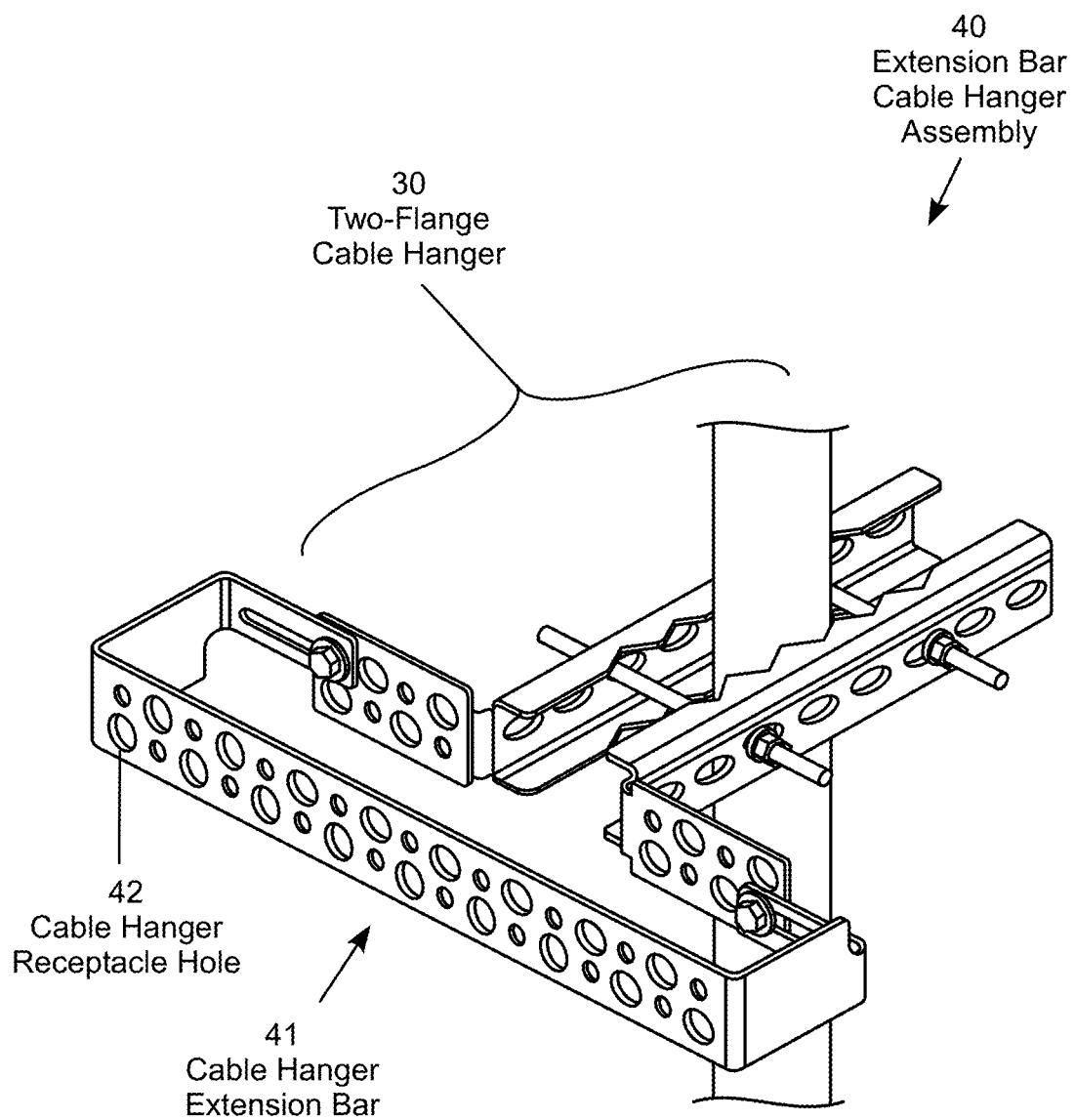
FIG. 4 (prior art) is a perspective view of a conventional extension bar cable hanger assembly.
Figure 5A:
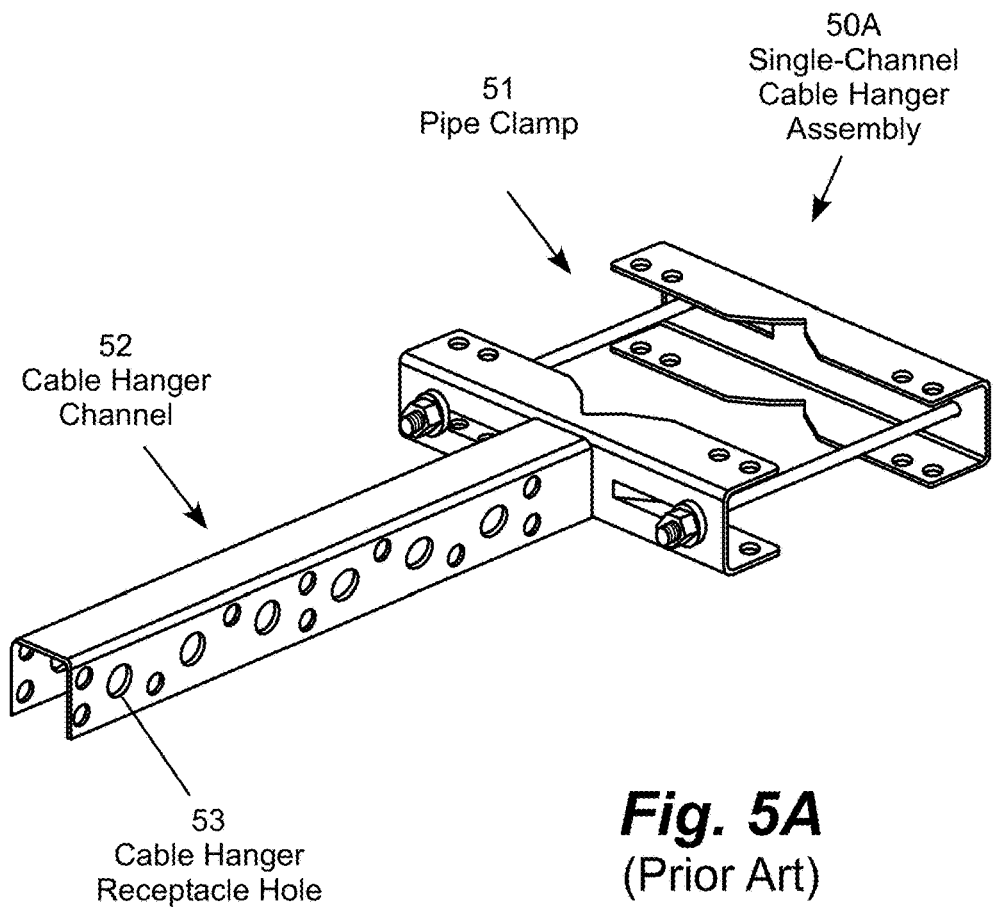
FIG. 5A (prior art) is a perspective view of a conventional single-channel cable hanger assembly.
Figure 5B:
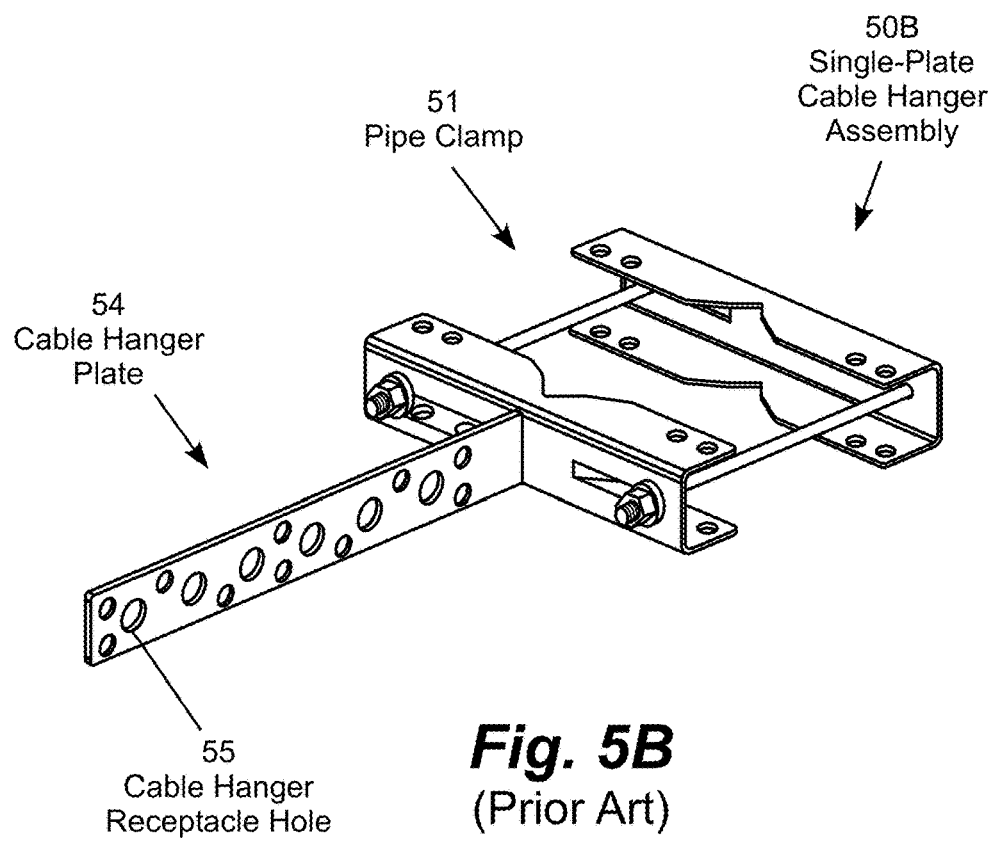
FIG. 5B (prior art) is a perspective view of a conventional single-plate cable hanger assembly.

Embodiments of the invention may be embodied in a stand-off clamp cable mounting system for organizing and securing cables at cellular telephone base station antenna sites. In an illustrative embodiment, a stand-off clamp cable mounting assembly includes a cable hanger mounting plate attached to a pair of extended threaded rods (e.g., clamp bolts) that also secure the clamp to a support structure, such as a mast (e.g., vertical pipe). Attaching the cable hanger mounting plate directly to the pair of threaded rods provides lateral stability to prevent the cable hanger mounting plate from rotating with respect to the support structure under the weight of the cables and wind loads. In addition, attaching the cable hanger mounting plate directly to the threaded rods of the clamp allows a wide range of cable hanger configurations to be created with a minimal number of parts. For example, alternative embodiments can be created by varying the stand-off distance between the cable hanger mounting plate and support structure, by varying the alignment between the cable hanger mounting plate and the clamp, and by varying the length of the cable hanger mounting plate.

Additional alternative embodiments can be created by attaching two mounting plates to the same extended threaded rods on opposing sides of the clamp. Cable hanger mounting plates can be formed from flat plates as well as a variety of channels, such as channels with "C", "Z", "U", and "comb" shaped end profile shapes. Low passive intermodulation (PIM) embodiments can be created by utilizing low-PIM cable hangers or a low-PIM cable hanger mounting plate, such as a cable hanger mounting plate fabricated from or coated with a polymeric material.

The design of the stand-off clamp cable mounting system allows a small number of parts to be used to create a wide range of cable hanger configurations. In particular, a supply of clamp brackets, a variety of lengths of threaded rods, a variety of lengths of cable hanger mounting plates, common assembly hardware (e.g., nuts, washers, lock washers), and a supply of cable hangers can be used to assemble a wide range of cable hanger configurations. Certain stand-off clamp cable mounting assemblies utilize stainless or galvanized steel cable hanger mounting plates and stainless or galvanized steel assembly hardware. These embodiments exhibit low-PIM performance by firmly tightening the assembly hardware and attaching low-PIM cable hangers to the receptacle holes of the metallic cable hanger mounting plates. In other assemblies, low-PIM performance by is achieved by utilizing cable hanger mounting plates fabricated from or coated in a low-PIM polymeric material. These embodiments can utilize cable hangers with metallic feet that attach the cable hangers to the low-PIM cable hanger mounting plates.

The stand-off clamp cable mounting assemblies improves over conventional cable hanger assemblies because the system can be easily adapted to provide a wide variety of cable support configurations with a minimum number of parts. The stand-off clamp cable mounting system is also designed for organizing and securing a large number of cables to both sides of a support structure, such as a vertical mast, with tight and looping cable routing requirements.

Low-PIM stand-off clamp cable mounting assemblies further improve upon conventional cable hanger assemblies by eliminating the known sources of PIM interference created by cable hanger assemblies in the potential PIM reactive zones near cellular base station antennas. There are three design techniques of the stand-off clamp cable mounting system that help to minimize PIM. Since galvanic steel and stainless steel are on opposite sides of the galvanic spectrum, the first design technique is elimination of galvanic mismatch throughout the assembly by preventing stainless steel components from coming into direct contact with galvanized steel components. In most cases, the clamp that attaches to the support structure is fabricated from galvanized steel because the antenna support structure is usually fabricated from galvanized steel. The threaded rods, cable hanger mounting plates, and assembly hardware are also typically fabricated from galvanized steel so the entire system is assembled from galvanized steel components. As an alternative, polymeric bushings may be utilized at the connection points between galvanized steel components and stainless steel components to avoid galvanic mismatch. The second design technique is to limit the size of contact surfaces and apply high contact pressure at all metal-to-metal connections by firmly tightening the assembly hardware between the support structure and the clamp, between the clamp and the threaded rods, and between the threaded rods and the cable hanger mounting plate. A combination of firmly tightening the assembly hardware and limiting the size of the contact surfaces achieves high contact pressure at these interfaces. The third design technique is to insulate the connection between the cable holders and the cable hanger mounting plate.

Embodiments of the invention may be utilized in concert with other techniques to reduce PIM at cellular base stations, such as the low-PIM cable bracket described in commonly owned U.S. Pat. No. 10,724,655; the low-PIM stackable cable hanger described in commonly owned U.S. Pat. No. 10,637,229; the low-PIM cable hanger spacer described in commonly owned U.S. Patent Pub. No. 20200109800, the low-PIM universal mount described in commonly owned U.S. Patent Pub. No. 20200119425, and the low-PIM cable rail system described in U.S. Pat. No. 10,734,719, which are incorporated by reference. The stand-off clamp cable mounting assemblies may also accept many types conventional metal hangers, such as those described in Paske, U.S. Pat. No. 6,354,543 and Feige, U.S. Pat. No. 8,439,316, which are incorporated by reference. The stand-off clamp cable mounting assemblies may also accept certain conventional plastic cable hangers, such as those described in Vacarro, U.S. Pat. No. 10,253,906, which is also incorporated by reference.

While the low-PIM stand-off clamp cable mounting assemblies can be utilized in any desired location, they are effective for mitigating PIM interference when deployed in the potential PIM reactive zone near a base station antenna. Although PIM generation is a function of the antenna broadcast frequency and power, equipment specifications may use a standard distance, such as 10-feet from the antenna, to establish the potential PIM reactive zone where PIM mitigation is considered to be appropriate. In other cases, the potential PIM reactive zone may be defined relative to the wavelength of the antenna's operational frequency, such as within one or two wavelengths of the downlink (main beam) frequency channel of the antenna.

The cables extending from the base station antenna and associated equipment are typically routed and secured to mounting structures in the potential PIM reactive zone. Even though the cables are typically routed behind the main beam of the antenna, enough RF energy can be present in this region to excite non-linear objects and generate PIM interference. For this reason, all directions from the base station within a standard distance, such as 10-feet from the antenna, may be considered to be within the potential PIM reactive zone. In conventional cell sites, metal cable hangers and associated hardware for supporting RF, optical, ground and remote electrical tilt ("RET") cables located in the potential PIM reactive zone behind base station antennas are common locations of loose metal-to-metal contact that can generate significant levels of PIM.

Figure 6:
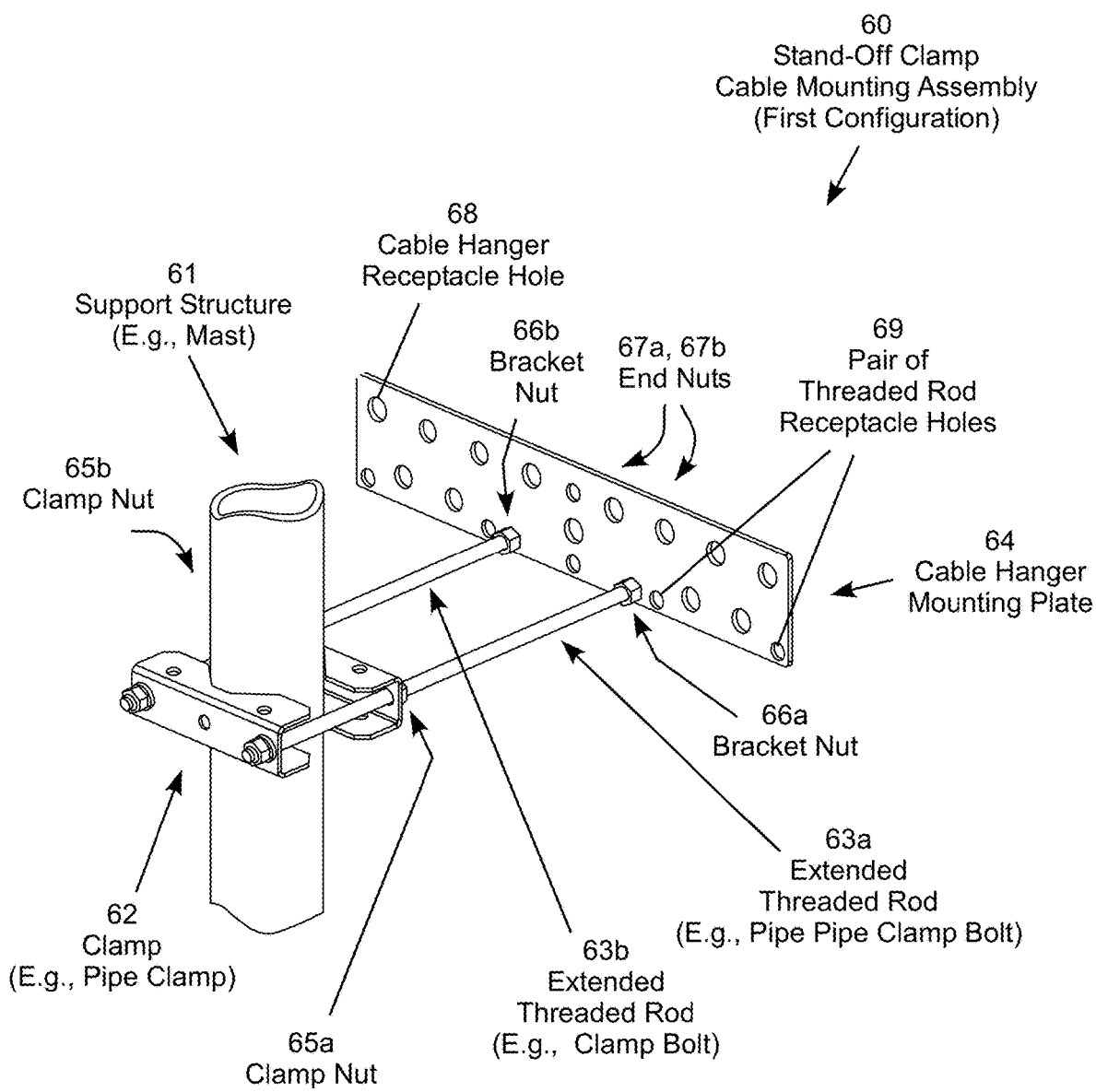
FIG. 6 is a perspective view of a stand-off clamp cable mounting assembly in a first configuration.

FIG. 6 shows a representative stand-off clamp cable mounting assembly 60 in a first configuration. FIG. 6 also depicts orthogonal axial, transverse, and longitudinal spatial dimensions for descriptive reference. The stand-off clamp cable mounting system 60 includes a clamp 62 (e.g., pipe clamp) attached to a support structure 61, such as an upright mast (e.g., vertical pipe). The clamp 62, which is fabricated from a pair of clamp brackets, threaded rods 63a, 63b (e.g., clamp bolts or threaded rods without heads) and attachment hardware (e.g., nuts, washers, lock washers), allows the stand-off clamp cable mounting assembly 60 to be attached to the support structure 61 at a range of positions in the axial dimension. The stand-off clamp 62 includes a pair of extended threaded rods 63a, 63b, such as clamp bolts, that secure the clamp to the support structure 61 while extending away from the clamp to also support a cable hanger mounting plate 64 positioned away from the clamp along the threaded rods. In this example, the support structure 61 is elongated in the axial dimension, the threaded rods 63a, 63b are elongated in the transvers dimension and spaced apart in the longitudinal dimension, and the cable hanger mounting plate 64 is elongated in the longitudinal dimension. Clamp nuts 65a, 65b (only clamp nut 65a is visible in FIG. 6) are threaded onto the extended threaded rods 63a and 63b, respectively, to secure the clamp 62 to the support structure 61. Bracket nuts 66a and 66b threaded onto the threaded rods 63a and 63b, respectively, position the cable hanger mounting plate 64 a "stand-off distance" away from the support structure in the transverse dimension. End nuts 67a, 67b (labeled but not shown in FIG. 6) threaded onto the extended threaded rods 63a and 63b, respectively, are tightened against the bracket nuts 66a and 66b, respectively, with the cable hanger mounting plate 64 positioned between the bracket nuts and the end nuts (typically with suitable washers and lock washers) to secure the cable hanger mounting plate at the desired stand-off distance from the clamp 62. The clamp nuts, bracket nuts, and end nuts are typically interchangeable standard sized nuts used to assemble the clamps and cable mounts with standard sized washers and lock washers to minimize the number of different parts in the attachment hardware inventory.

The lengths of the threaded rods 63a and 63b and positions of the bracket nuts 66a and 66b can be adjusted to position the cable hanger mounting plate 64 at a range of stand-off distances from the support structure 61 in the transverse dimension. The cable hanger mounting plate 64 includes a number of cable hanger receptacle holes, represented by the enumerated cable hanger receptacle hole 68, allowing a variety of cable hangers to be connected to the cable hanger mounting plate at a variety of locations on the cable hanger mounting plate. The cable hanger mounting plate 64 also includes a number of pairs of threaded rod receptacle holes, represented by the enumerated threaded rod receptacle holes 69, allowing the mounting plate to be connected to the threaded rods 63a and 63b at a variety of positions in the longitudinal dimension. More specifically, the cable hanger mounting plate 64 includes multiple pairs of the threaded rod receptacle holes, with each pair corresponding to the nominal longitudinal of the spacing of the threaded rods 63a and 63b. This allows the cable hanger mounting plate to be attached to the threaded rods at a variety of positions in the longitudinal dimension, providing flexibility in the longitudinal alignment between the cable hanger mounting plate 64 and the clamp 62. The threaded rod receptacle holes 69 also allow the threaded rods 63a and 63b to pass through the cable hanger mounting plate 64. This allows the cable hanger mounting plate 64 to be attached to the threaded rods 63a and 63b at a range of stand-off distances from the support structure 61 in the transverse dimension. These features allow the stand-off clamp cable mounting system 60 to be easily adapted to provide a wide range of cable support and positioning configurations to meet a wide range of multiple-cable routing requirements including those involving tight and looped cable routing configurations.

Figure 7A:
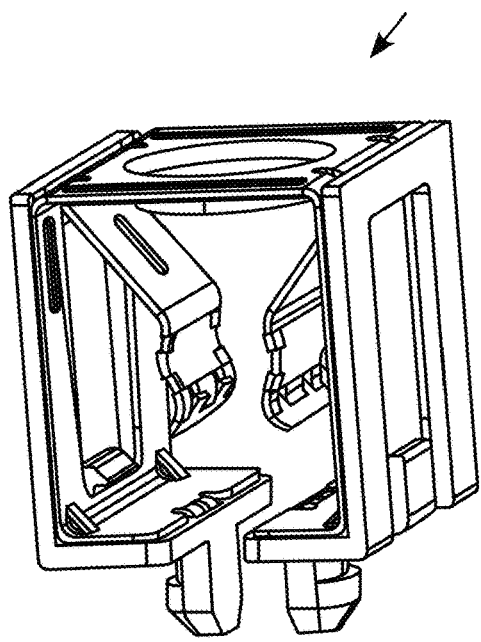
FIG. 7A is a perspective view of a first example cable hanger for use with the stand-off clamp cable mounting system.
Figure 7B:
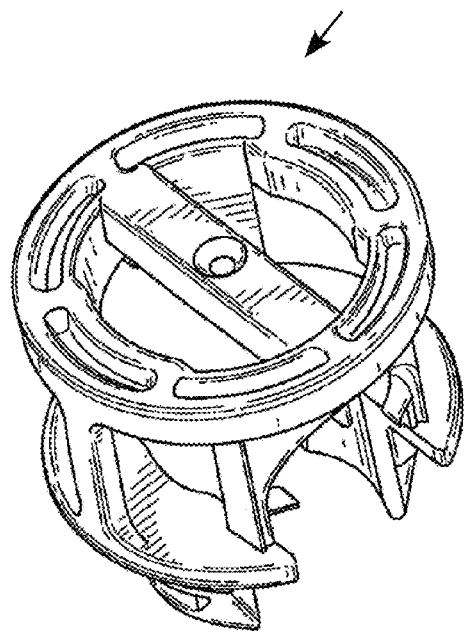
FIG. 7B (prior art) is a perspective view of a second example cable hanger for use with the stand-off clamp cable mounting system.
Figure 7C:
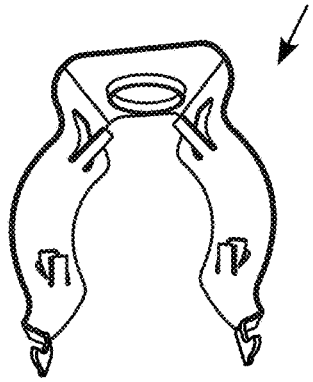
FIG. 7C (prior art) is a perspective view of a third example cable hanger for use with the stand-off clamp cable mounting system.
Figure 7D:
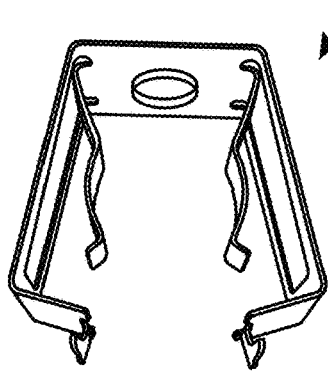
FIG. 7D (prior art) is a perspective view of a fourth example cable hanger for use with the stand-off clamp cable mounting system.

The cable hanger receptacle holes are sized to receive the feet of a variety of commercially available cable hangers. In general, the cable hanger receptacle holes may be nominal ¾ inch round holes, which have been adopted as a standard size for a variety of commercially available cable hangers. FIGS. 7A-7D depict four commercially available cable hangers that can be used with the stand-off clamp cable mounting system with standard ¾ inch round cable hanger receptacle holes. FIG. 7A shows a low-PIM cable hanger 70A that includes a polymeric jacket attached to a metal hanger body as described in Bell et al., U.S. Pat. No. 10,637,229. FIG. 7B shows an all plastic cable hanger 70B as described in Vacarro, U.S. Pat. No. 10,253,906. Since the cable hangers 70A and 70B include polymeric feet and mounting surfaces, they can be used to create low-PIM connections with stand-off clamp cable mounting systems that include metallic cable hanger mounting plates. FIGS. 7C and 7D show conventional metal cable hangers 70C and 70D, respectively, that have metallic feet sized to fit into standard ¾ inch cable hanger receptacle holes. Since the cable hangers 70C and 70D include metallic feet and mounting surfaces, they can be used to create low-PIM connections with stand-off clamp cable mounting systems that include cable hanger mounting plates fabricated from or coated with a polymeric material.

Figure 8:
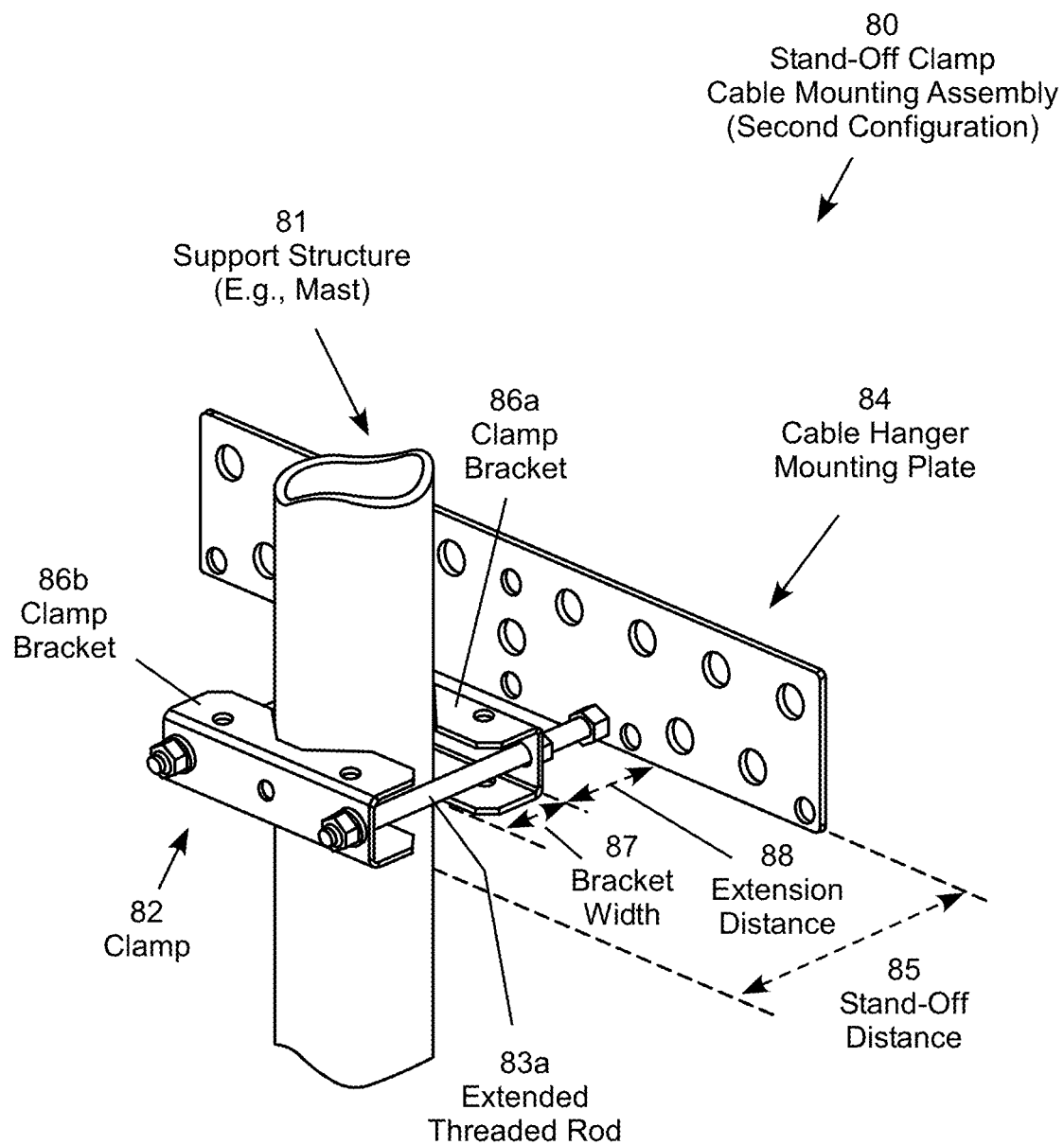
FIG. 8 is a perspective view of the stand-off clamp cable mounting assembly in a second configuration.

FIGS. 8-12 illustrate the flexibility of the stand-off clamp cable mounting system utilizing a minimal number of parts. For example, FIG. 8 illustrates a stand-off clamp cable mounting assembly 80 in a second configuration in which the stand-off distance between the cable hanger mounting plate 84 and the support structure 81 is less than the stand-off distance between the cable hanger mounting plate 64 and the support structure 61 of the assembly shown in FIG. 6. The support structure 81 is a mast, in this example a round pipe, that is elongated along the axial dimension. The mast is typically, but not necessarily, vertically oriented. The cable hanger mounting plate 84 is elongated in the longitudinal dimension and positioned a stand-off distance 85 from the support structure 81 in the transverse dimension. More specifically, the threaded rods, represented by the enumerated threaded rod 83a, support the cable hanger mounting plate 84 the stand-off distance 85 from the support structure 81 in the transverse dimension. The clamp 82 includes two clamp brackets 86a and 86b that are tightened onto the support structure 81 by suitable attachment hardware (e.g., nuts, washers) carried on the threaded rods. The clamp bracket 86a nearest to the cable hanger mounting plate 84 in the transverse dimension has a bracket width 87 in the transverse dimension. The cable hanger mounting plate 84 is supported an extension distance 88 from the clamp bracket 86a in the transverse dimension. In this particular embodiment, the extension distance 88 is greater than the bracket width 87 in the transverse dimension.

Figure 9:
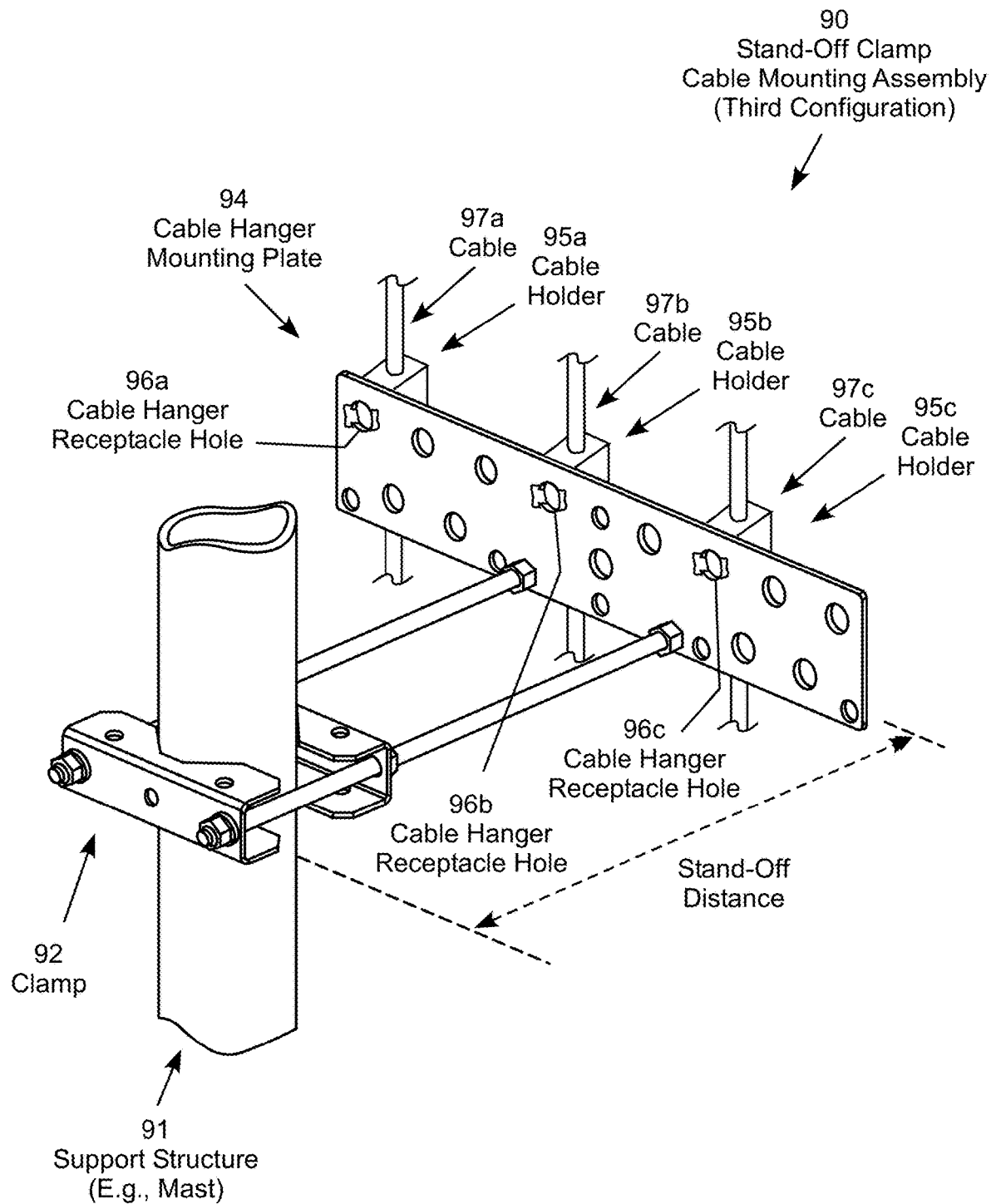
FIG. 9 is a perspective view of the stand-off clamp cable mounting assembly in a third configuration.

Similarly, FIG. 9 illustrates a stand-off clamp cable mounting assembly 90 in a third configuration in which the stand-off distance between the cable hanger mounting plate 94 and the support structure 91 is greater than the stand-off distance between the cable hanger mounting plate 64 and the support structure 61 of the assembly shown in FIG. 6. In general, a technician can replace the threaded rods with threaded rods of a desired length to allow the cable hanger mounting plate to be positioned a desired stand-off distance from the support structure 91. FIG. 9 also depicts three representative cable holders 95a-95c received in respective cable hanger receptacle holes 96a-96c of the cable hanger mounting plate 94. Each cable holder 95a-95c supports a respective cable 97a-97c. Although single-cable cable holders are illustrated, a variety of multi-cable holders and support brackets may also be supported by the cable hanger mounting plate 94.

Figure 10:
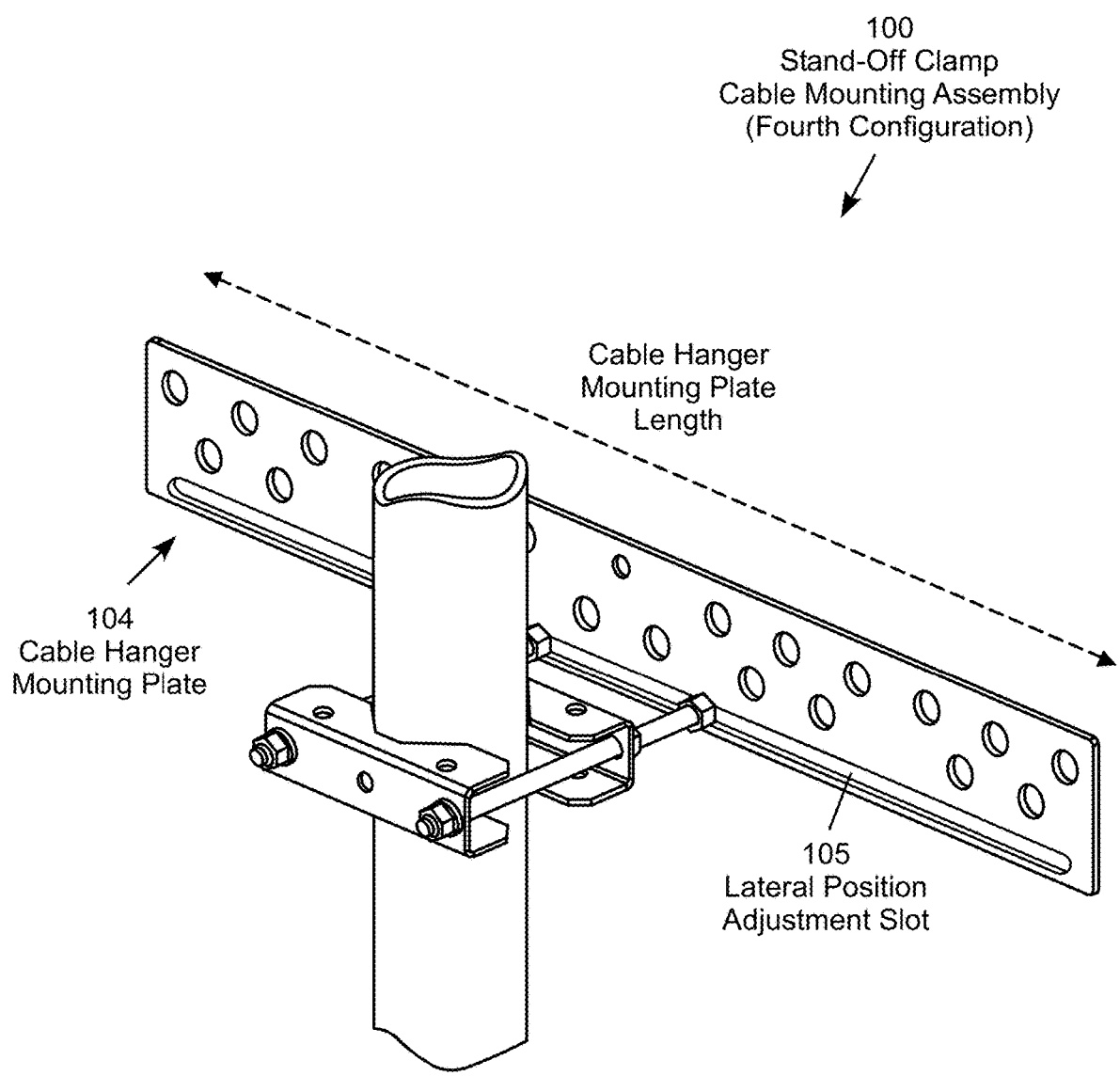
FIG. 10 is a perspective view of the stand-off clamp cable mounting assembly in a fourth configuration.
Figure 11:
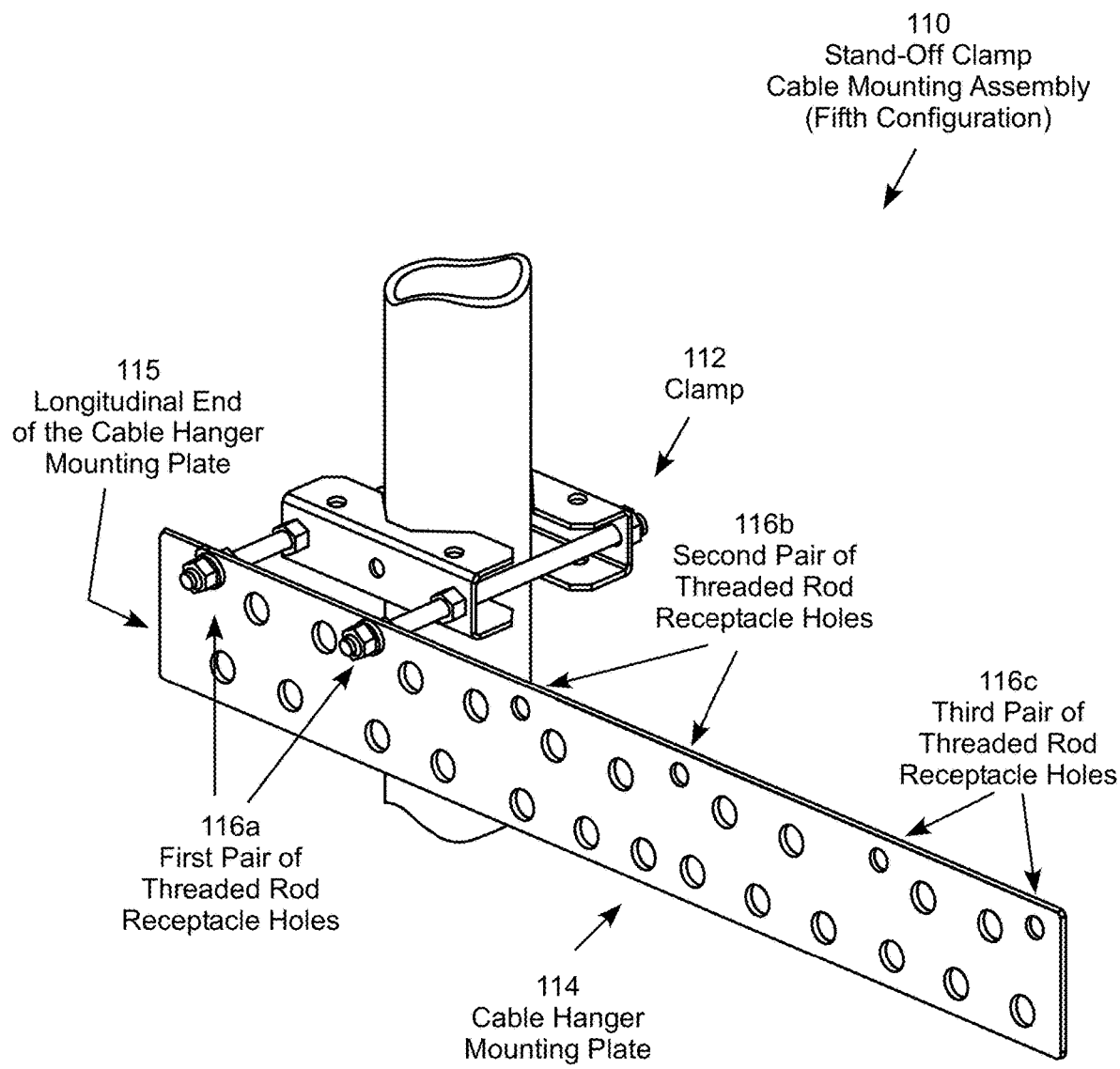
FIG. 11 is a perspective view of the stand-off clamp cable mounting assembly in a fifth configuration.
Figure 12:
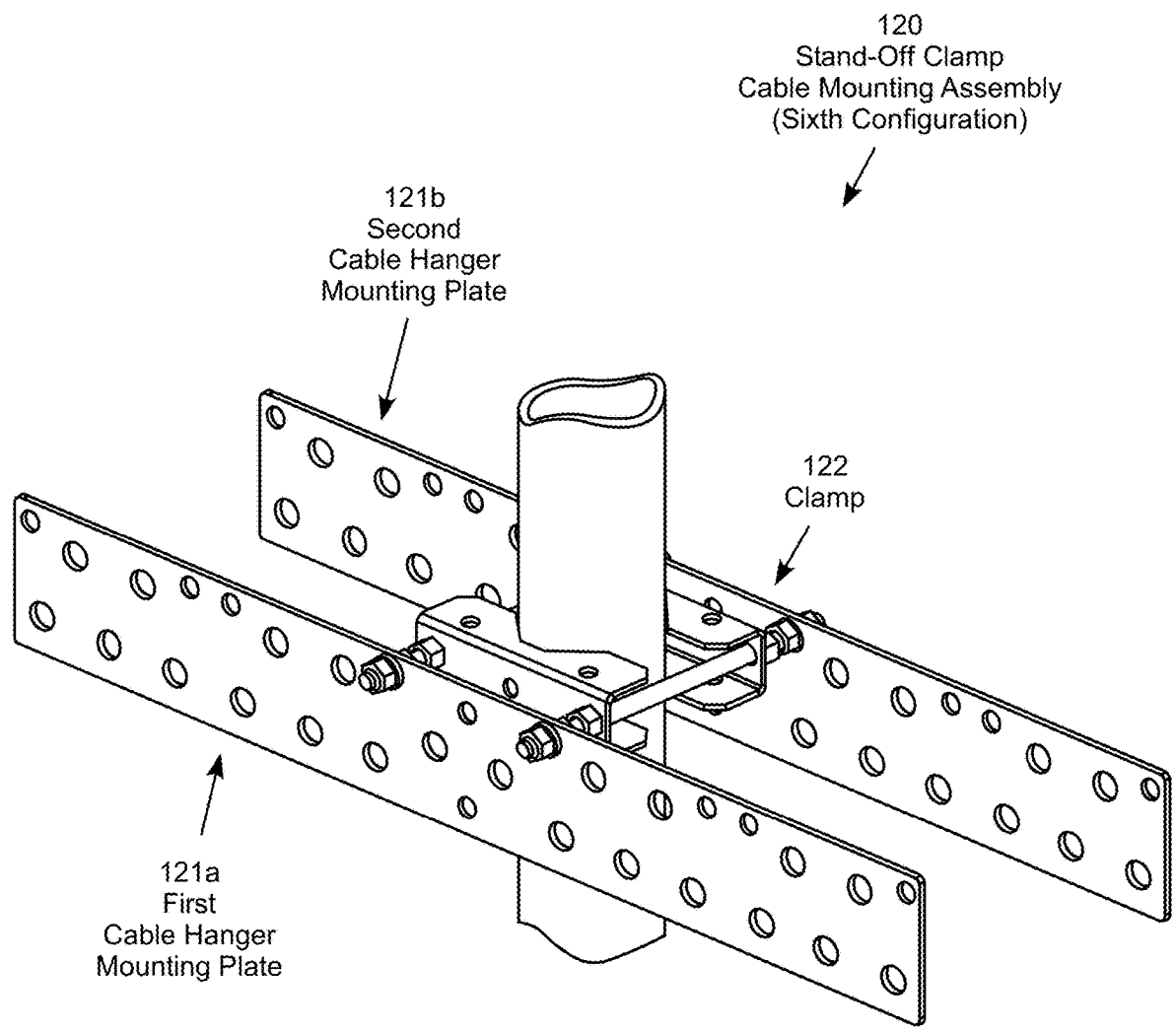
FIG. 12 is a perspective view of the stand-off clamp cable mounting assembly in a sixth configuration.

To illustrate another configuration flexibility feature of the system, FIG. 10 illustrates a stand-off clamp cable mounting assembly 100 in a fourth configuration in which the cable hanger mounting plate 104 is longer in the longitudinal direction than the mounting plate 64 the assembly shown in FIG. 6. FIG. 10 also illustrates a lateral position adjustment slot 105, which is an alternate feature for configuring the cable hanger mounting plate 104 with position adjustment flexibility in the longitudinal dimension. FIG. 11 illustrates another configuration flexibility feature of the system. This example includes a stand-off clamp cable mounting assembly 110 in a fifth configuration in which the cable hanger mounting plate 114 is mounted to the clamp 112 toward one longitudinal end 115 of the cable hanger mounting plate 114. The cable hanger mounting plate 114 includes a repeating hole pattern that allows the cable hanger mounting plate 114 to be attached to the clamp 112 with a number of different alignments in the longitudinal dimension between the cable hanger mounting plate and the clamp. In this example, the repeating hole pattern is represented by the enumerated locations including a first pair of threaded rod receptacle holes 116a, a second pair of threaded rod receptacle holes 116b, and a third pair of threaded rod receptacle holes 116c. FIG. 12 illustrates a stand-off clamp cable mounting assembly 120 in a sixth configuration, in which two cable hanger mounting plates 121a and 121b are attached to the same pair of threaded rods on opposing sides of a common clamp 122. The configuration flexibility features illustrated by FIG. 8-12 can be combined and tailored to create a wide range of cable routing configurations with a minimal number of parts, which allows a technician to assemble a wide range of cable mounting configurations by selecting among a few standard lengths of the mounting plates and threaded rods, along with common assembly hardware, from a small number of components carried on a technician's utility truck.

Figure 13A:
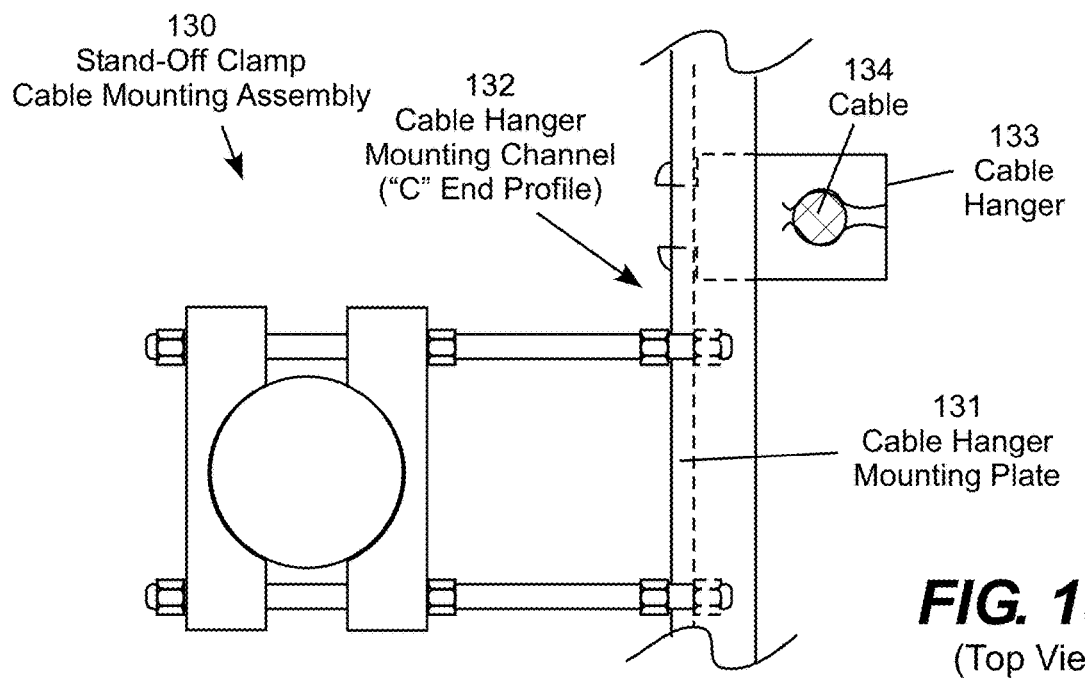
FIG. 13A is a conceptual top view of a stand-off clamp cable mounting system assembly with a cable hanger mounting channel with a "C" shaped end profile.
Figure 13B:
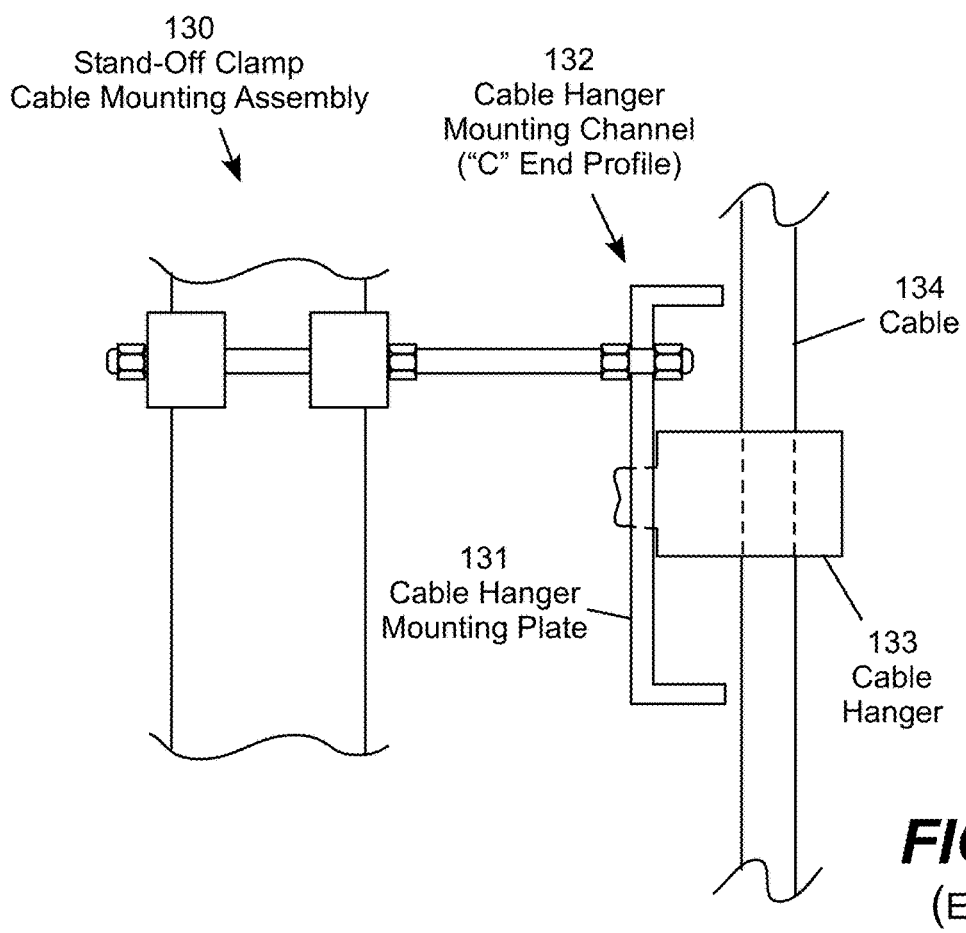
FIG. 13B is a conceptual end view of the stand-off clamp cable mounting assembly with the cable hanger mounting channel with the "C" shaped end profile.
Figure 14A:
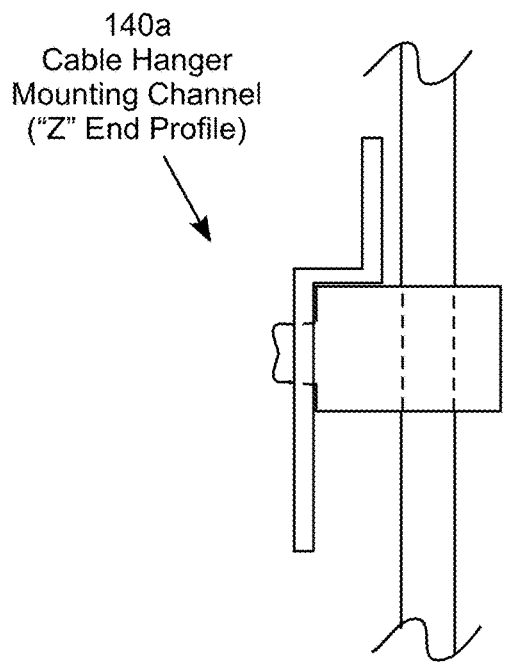
FIG. 14A is a conceptual end view of a cable hanger mounting channel with a "Z" shaped end profile.
Figure 14B:
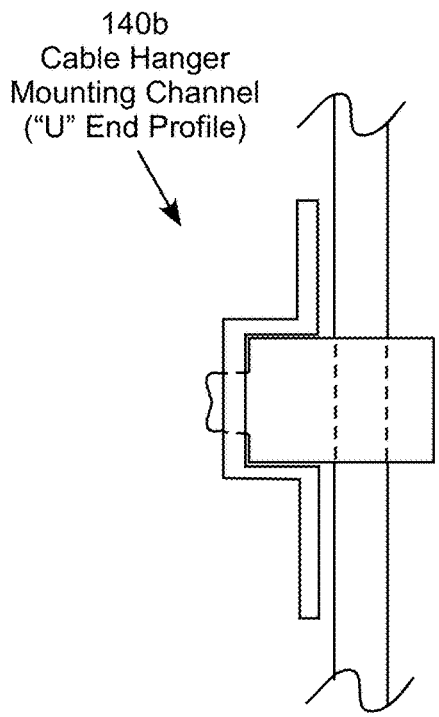
FIG. 14B is a conceptual end view of a cable hanger mounting channel with a "U" shaped end profile.
Figure 14C:
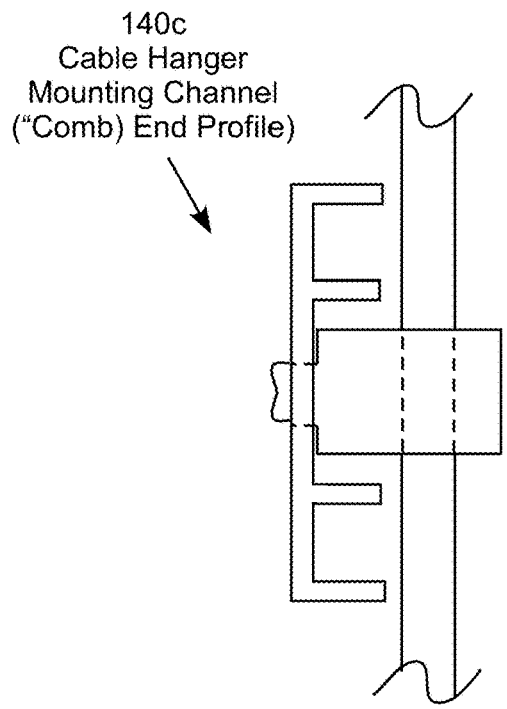
FIG. 14C is a conceptual end view of a cable hanger mounting channel with a "comb" shaped end profile.

FIGS. 13A and 13B illustrate a technique for adding stiffness to the cable hanger mounting plates. FIG. 13A is a top view and FIG. 13B is an end view of a stand-off clamp cable mounting cable mounting assembly 130 including a cable hanger mounting plate 131 that is formed as part of a channel 132. The cable hanger mounting plate 131 supports a number of cable hangers represented by the depicted cable hanger 133. Each cable hanger supports one or more cables represented by the depicted cable 134. The cable hanger mounting channel 132 has a "C" shaped end profile to add strength and resist bending and twisting. This type of strengthening feature can be added during the extruding process for metal mounting plates and incorporated into the molds for polymeric mounting plates. To achieve additional stiffness, ribs may be added in the length or width directions. For the polymeric versions (as well as extruded aluminum metallic version) these ribs may be incorporated in the extruded profile. For the steel versions, the strengthening features may be accomplished by adding bends to a sheet metal blank. A polymeric coating may be applied after the sheet metal blank has been formed into the desired shape. For additional examples, FIG. 14A is an end view of a cable hanger mounting channel 140a with a "Z" shaped end profile, FIG. 14B is an end view of a cable hanger mounting channel 140b with a "U" shaped end profile, and FIG. 14C is an end view of a cable hanger mounting channel 140c with a "comb" shaped end profile. Cable hanger mounting channels with other shapes may also be used, such as square or rectangular profiles, and so forth.

For the embodiments including cable hanger mounting channels, the width of the channel is generally determined by the cable hanger the channel is designed to support and should prevent the cable hanger mounting channel from pressing directly against the cable. In order to be able to compress the snap-in attachment feet of the cable hanger towards each other, there should be a clearance distance that spaces the cable away from the channel. Geometric features of the channel that are less than this clearance distance add stiffness without interfering with the cables. Given that stiffness of a channel increases with the cube of channel width dimension, small increases in channel width will produce a very large increase in stiffness. The stiffening feature become increasingly important as the channel becomes longer or produced from weaker materials, such as thinner sheet metal or materials with lower modulus of elasticity compared to steel such as aluminum, extruded plastic, etc.

A metallic cable hanger mounting plate may be made of galvanized steel, stainless steel, electroplated steel or another suitable material. A polymeric cable hanger mounting plate may be made of may be fabricated, for example, from injection molded, glass filled nylon, ASB (acrylonitrile butadiene styrene), Acetal or POM (polyoxymethylen), PC (polycarbonate), PVC (polyvinyl chloride), and the like. Alternatively, a metal mounting plate body may be coated with a suitable polymeric material, such as PVC, natural or synthetic rubber, urethane, acrylic, epoxy, or the like. The cable mounting plates are also amenable to other suitable fabrication processes, such as compression molding, 3D printing, and so forth.

Figure 15A:
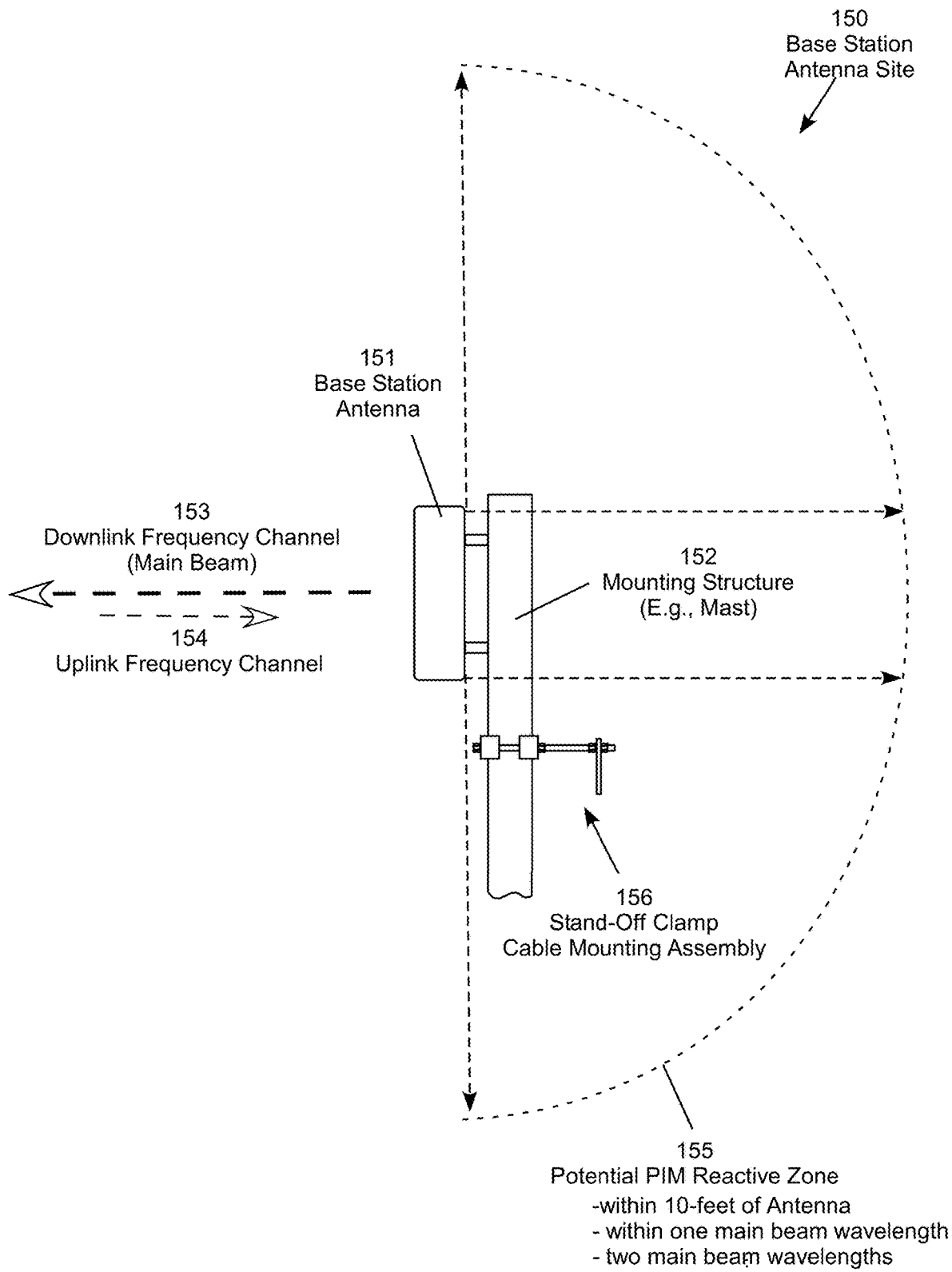
FIG. 15A is a conceptual side view of a base station antenna site with a low-PIM stand-off clamp cable mounting assembly positioned within a potential PIM reactive zone of a base station antenna.
Figure 15B:
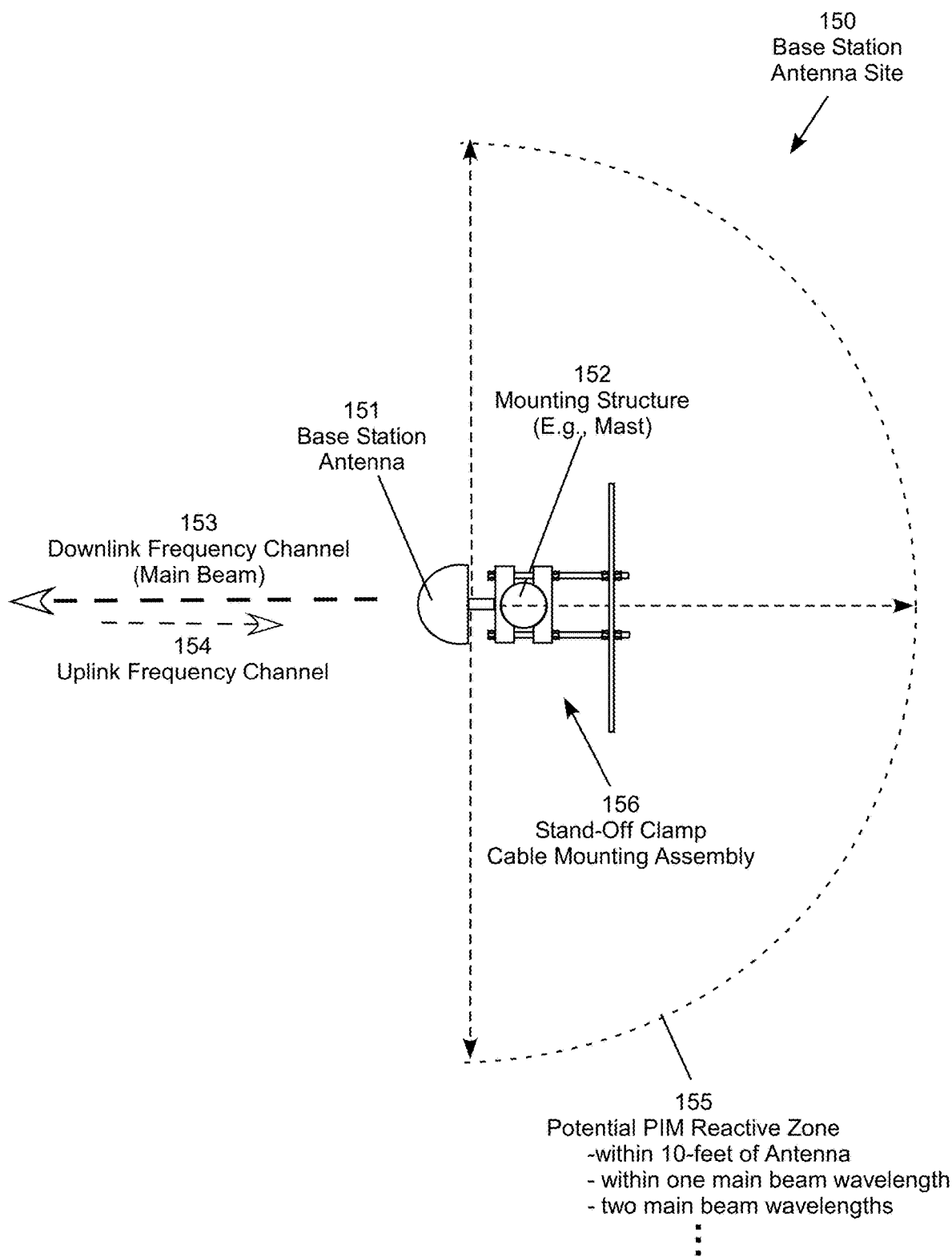
FIG. 15B is a conceptual top view of the base station antenna site with the low-PIM stand-off clamp cable mounting assembly positioned within the potential PIM reactive zone of a base station antenna.

FIG. 15A is a conceptual side view and FIG. 15B is a conceptual top view of a representative base station antenna site 150 that includes a base station antenna 151 supported by a support structure 152, such as a vertical mast (e.g., metal pipe). To briefly recap the problem to be solved, the antenna 151 directionally broadcasts higher-power downlink communication signals away from the antenna (generally referred to as the "main beam" of the antenna) within a downlink frequency channel 153 to registered mobile communication devices within the communication reach of the antenna. The antenna 151 also receives lower-power uplink communication signals from the registered mobile communication devices within a separate uplink frequency channel 154 allowing for duplex communications, such as mobile telephone conversations, between the antenna 151 and the registered mobile communication devices within the communication reach of the antenna. Passive intermodulation ("PIM") interference occurs when the downlink signals within the downlink frequency channel 153 mix at nonlinear junctions near the antenna 151 to create noise within the uplink frequency channel 154 received by the antenna. The PIM interference decreases the signal-to-interference plus-noise ratio ("SINR") of the uplink channel of the antenna 151, which reduces the communication quality and information carrying capacity (bandwidth) of the uplink frequency channel.

It is well documented that loosely touching metal-to-metal surfaces can behave in a non-linear fashion and become sources of PIM interference when illuminated by high power RF signals. For this reasons, the coaxial cables and other components associated with operation of the antenna are located well outside and behind the main beam of the antenna. It has recently been determined, however, that loose metal-to-metal connections located behind a base station antenna can generate high levels of passive intermodulation. Even though this region is well outside the main beam of the antenna, enough RF energy can be present in this region to excite non-linear objects and generate PIM interference. Metal brackets and associated hardware for supporting RF, optical, ground and remote electrical tilt ("RET") cables are common sources of loose metal-to-metal contact found in this region behind and close to the base station antenna. Embodiments of the present invention include a range of low-PIM stand-off clamp cable mounting assemblies designed to mitigate PIM interference by the equipment used to support the cables and other components associated with the operation of the antenna, which are typically located near the antenna outside the main beam of the antenna.

To develop standards for mitigating PIM, technicians may define a potential PIM reactive zone 155 in which PIM mitigation equipment should be installed. FIGS. 15A-15B illustrate this practice for a representative example base station antenna site 150, in which a representative low-PIM stand-off clamp cable mounting assembly 156 is attached to the support structure 152 within a potential PIM reactive zone 155 defined for an antenna 151. In this example, the representative low-PIM cable hanger assembly 156 is located well outside the main beam 153 and physically behind the antenna 151 on the opposite side of the support structure 152 from the antenna. The low-PIM stand-off clamp cable mounting assembly 156 is nevertheless specified to provide PIM mitigation because it is still located with the potential PIM reactive zone 155 defined for the antenna 151. The low-PIM stand-off clamp cable mounting assembly 156 is representative of the low-PIM cable hanger assemblies generally, as all of the low-PIM cable hanger assemblies described in the disclosure, and variations of these specific examples, are intended for deployment as PIM mitigation measures in the potential PIM reactive zones of cellular base station antennas.

While the low-PIM stand-off clamp cable mounting system assembly embodiments of the present invention can be utilized in any desired location, they are particularly effective for mitigating PIM interference when deployed in the potential PIM reactive zone 155 near the base station antenna 151. Although PIM generation is a function of the antenna broadcast frequency and power, technicians may use a standard distance, such as 10-feet from the antenna 151, to establish the potential PIM reactive zone 155 where PIM mitigation is appropriate. As other options, the potential PIM reactive zone 155 may be established to be a function of the antenna broadcast frequency, such as one or two wavelengths of the main beam frequency channel 153 of the antenna 151. Other factors, such as the broadcast power of the antenna 151, the presence of reflective surfaces in the physical environment of the antenna, the width of the uplink channel, the use of electronic filtering, and other relevant factors may also be taken into account when establishing the potential PIM reactive zone for a particular antenna. For administrative simplicity, however, the standard set for potential PIM reactive zone 155 may ultimately be defined to be a set distance, such as 10-feet from the antenna.

Figure 16:
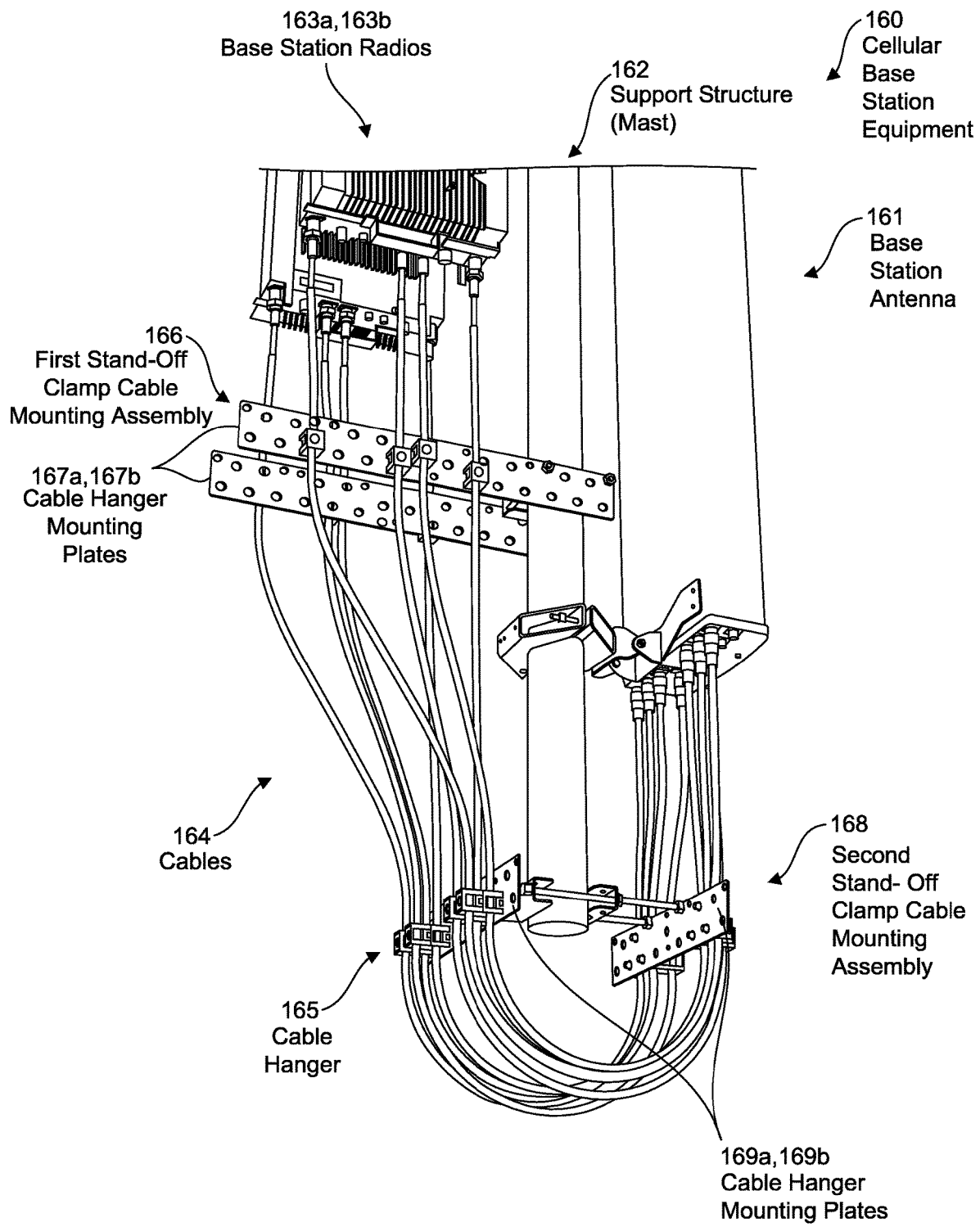
FIG. 16 is a perspective view of cellular base station equipment including two stand-off clamp cable mounting assemblies.

FIG. 16 is a perspective view of cellular base station equipment 160 including a base station antenna 161 attached to a support structure 162, which in this example is a vertical mast. A pair of base station radios 163a, 163b are attached to the same support structure 162 within a few feet from the base station antenna 161. In this embodiment, 8 cables 164 are connected between the base station radios 163 the base station antenna 161. The cables are looped in a tight cable routing configuration as a result of the close spacing between the base station radios and the antenna attached to the common support structure. A number of cable hangers represented by the enumerated cable hanger 165 are used to organize and secure the cables 164. The cable hangers 165 are positioned and supported by a pair of standoff clamp cable mounting systems 166 and 168.

A first standoff clamp cable mounting assembly 166 secures the cables 164 near the base station radios 163a and 163b, typically within 18 inches from the radios. The first standoff clamp cable mounting assembly 166 utilizes two cable hanger mounting plates 167a and 167b attached to the common support structure 162, which also supports the base station radios 163a and 163b and the base station antenna 161. Each cable hanger mounting plate secures the cables coming from a respective radio to the support structure. The cable hanger mounting plates 167a, 167b are mounted on opposing sides of the support structure 162 to facilitate routing the cables from the radios 163a, 163b, which are also secured to opposing sides of the support structure. To reach the desired cable support positions directly below the radios 163a and 163b, the cable hanger mounting plates 167a and 167b each have an offset longitudinal alignment with the support structure 162. More specifically, the cable hanger mounting plate 167a and 167b are each mounted adjacent to a longitudinal end of the cable hanger mounting plate as described previously with reference to FIG. 11. This configuration combines the longitudinal offset configuration feature shown in FIG. 11 with the dual mounting plate configuration feature shown in FIG. 12.

A second standoff clamp cable mounting assembly 168 secures the cables 164 near the bottom of the base station antenna 161, typically within 18 inches from the antenna. The second standoff clamp cable mounting system 168 also utilizes two cable hanger mounting plates 169a and 169b attached to the common support structure 162. Each of the cable hanger mounting plates 169a and 169b secures the cables coming from both radios 163a and 163b to the support structure 162 in a tightly looped configuration routing the cables from the radios to the antenna. The cable hanger mounting plates 169a and 169b are mounted on opposing sides of the support structure 162 to facilitate the looped cable routing configuration. This configuration utilizes the dual mounting plate configuration feature shown in FIG. 12 to implement the looped cable routing configuration from the radios 163a and 163b to the antenna 161. While FIG. 16 illustrates one representative cable routing configuration that can be implemented with the standoff clamp cable mounting system, it will be readily apparent that the system can be assembled to organize and secure cables in a wide variety of configurations.

Figure 17:
FIG. 17 is a block diagram illustrating the minimal number of parts of the stand-off clamp cable mounting system.

FIG. 17 is a block diagram 170 illustrating the minimal number of parts of the highly configurable stand-off clamp cable mounting system described above. All of the assembly configurations illustrated in these figures can be assembled from the minimal number of parts shown in FIG. 17, which includes a supply of clamp brackets 171, an assortment of threaded rods of various lengths 172, an assortment of cable hanger mounting plates of various lengths 173, a supply of attachment hardware (e.g., nuts, washers, lock washers) 174, and a supply of cable hangers 175.

Figure 18:
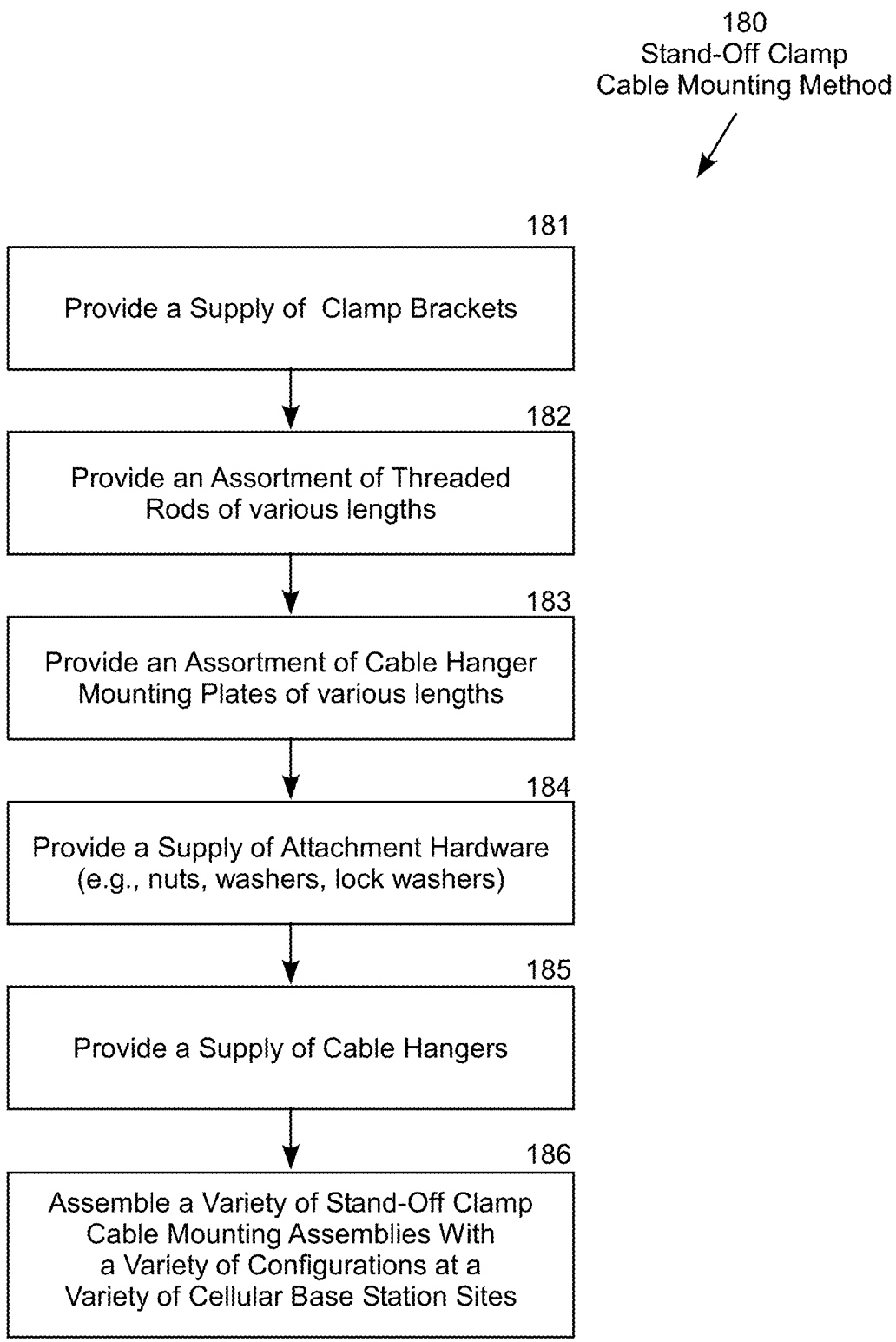
FIG. 18 is a block diagram illustrating a method for a stand-off clamp cable mounting system.

FIG. 18 is a block diagram illustrating a method 180 for a stand-off clamp cable mounting system. In steps 181-185, the operator of the method provides a minimal number of parts including a supply of clamp brackets, an assortment of threaded rods of various lengths, an assortment of cable hanger mounting plates of various lengths, a supply of attachment hardware (e.g., nuts, washers, lock washers), and a supply of cable hangers. The minimal number of parts is typically stored on a technician's utility truck for use at a variety of cellular base station sites. Steps 181-185 are followed by step 185, in which the technician assembles a variety of stand-off clamp cable mounting assemblies with a variety of configurations from the minimal number of parts at a variety of cellular base station sites. It will therefore be appreciated that the stand-off clamp cable mounting system provides an extraordinary range of configuration flexibility with a minimal number of parts that can be easily carried on a technician's utility truck.

Although particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A stand-off clamp cable mounting assembly, comprising:
   a clamp comprising a pair of clamp brackets and a pair of threaded rods attaching the clamp brackets to a support structure extending in an axial dimension, wherein the threaded rods are elongated in a transverse dimension orthogonal to the axial dimension;
   a pair of clamp nuts, each clamp nut releasably engaged with a respective threaded rod of the pair of threaded rods, wherein the clamp nuts configure the clamp for adjustable initial positioning and future repositioning in the axial dimension;
   a cable hanger mounting plate elongated in a longitudinal dimension orthogonal to the axial and transverse dimensions positioned with the threaded rods extending through the cable hanger mounting plate;
   a pair of bracket nuts, each bracket nut releasably engaged with a respective threaded rod of the pair of threaded rods, wherein the bracket nuts configure the cable hanger mounting plate for adjustable initial positioning and future repositioning in the transverse dimension;
   a pair of end nuts, each end nut releasably engaged with a respective threaded rod of the pair of threaded rods, wherein the end nuts are configured for tightening the cable hanger mounting plate against the bracket nuts with the cable hanger mount plate positioned at a selected standoff distance from the support structure in the transverse dimension;
   the cable hanger mounting plate further comprising a plurality cable hanger receptacle holes.

2. The stand-off clamp cable mounting assembly of claim 1, wherein the cable hanger mounting plate further comprises a plurality of pairs of threaded rod receptacle holes configuring the cable hanger mounting plate for adjustable initial positioning and future repositioning in the longitudinal dimension.

3. The stand-off clamp cable mounting assembly of claim 1, wherein the cable hanger mounting plate further comprises a lateral slot configuring the cable hanger mounting plate for adjustable initial positioning and future repositioning in the longitudinal dimension.

4. The stand-off clamp cable mounting assembly of claim 1, wherein each cable hanger receptacle hole is adapted to removably receive a snap-in cable hanger removably supporting an antenna communication or control cable, further comprising a plurality of snap-in cable hangers, each of the snap-in cable hangers removably received within a respective cable hanger receptacle hole of the plurality of cable hanger receptacle holes.

5. The stand-off clamp cable mounting assembly of claim 4, further comprising a plurality of cables, each cable extending through a respective cable hanger of the plurality of cable hangers.

6. The stand-off clamp cable mounting assembly of claim 5, wherein the cable hanger mounting plate is fabricated from a metallic material and each cable hanger comprises polymeric feet configuring each cable hanger for low-PIM attachment to the cable hanger mounting plate.

7. The stand-off clamp cable mounting assembly of claim 5, wherein each cable hanger comprises metallic feet and the cable hanger mounting plate is fabricated from or coated with a polymeric material configuring each cable hanger for low-PIM attachment to the cable hanger mounting plate.

8. The stand-off clamp cable mounting assembly of claim 1, wherein a channel comprises the cable hanger mounting plate.

9. The stand-off clamp cable mounting assembly of claim 8, wherein the channel comprises an end profile with a C shape, a Z shape, a U shape or a comb shape.

10. The stand-off clamp cable mounting assembly of claim 1, wherein the cable hanger mounting plate is a first cable hanger mounting plate, further comprising a second cable hanger mounting plate attached to the threaded rods.

11. A method for assembling stand-off clamp cable mounting assemblies having a variety configurations, comprising:
    providing a supply of clamp brackets;
    providing an assortment of threaded rods of various lengths;
    providing an assortment of cable hanger mounting plates of various lengths;
    providing a supply of attachment hardware including nuts interchangeably usable as clamp nuts, bracket nuts, and end nuts;
    providing a supply of cable hangers;
    assembling the clamp brackets, threaded rods, cable hanger mounting plates, and cable hangers to fabricate a plurality of stand-off cable mounting assemblies having a variety configurations, wherein each stand-off cable mounting assembly comprises:
      a clamp comprising a pair of threaded rods attaching the clamp to a support structure extending in an axial dimension, wherein the threaded rods are elongated in a transverse dimension orthogonal to the axial dimension;
      a pair of clamp nuts, each clamp nut releasably engaged with a respective threaded rod of the pair of threaded rods, wherein the clamp nuts configure the clamp for adjustable initial positioning and future repositioning in the axial dimension;
      a cable hanger mounting plate elongated in a longitudinal dimension orthogonal to the axial and transverse dimensions positioned with the threaded rods extending through the cable hanger mounting plate;
      a pair of bracket nuts, each bracket nut releasably engaged with a respective threaded rod of the pair of threaded rods, wherein the bracket nuts configure the cable hanger mounting plate for adjustable initial positioning and future repositioning in the transverse dimension;
      a pair of end nuts, each end nut releasably engaged with a respective threaded rod of the pair of threaded rods, wherein the end nuts are configured for tightening the cable hanger mounting plate against the bracket nuts with the cable hanger mount plate positioned at a selected standoff distance from the support structure in the transverse dimension;

the cable hanger mounting plate further comprising a plurality cable hanger receptacle holes, wherein each cable hanger receptacle hole is adapted to removably receive a snap-in cable hanger removably supporting an antenna communication or control cable.

12. The method of claim 11, further comprising providing each cable hanger mounting plate with a plurality of pairs of threaded rod receptacle holes configuring each cable hanger mounting plate for adjustable initial positioning and future repositioning in the longitudinal dimension.

13. The method of claim 11, further comprising providing each cable hanger mounting plate with a lateral slot configuring the cable hanger mounting plate for adjustable initial positioning and future repositioning in the longitudinal dimension.

14. The method of claim 11, wherein each cable hanger receptacle hole is adapted to removably receive a snap-in cable hanger removably supporting an antenna communication or control cable, further comprising removably receiving each of the snap-in cable hangers within a respective cable hanger receptacle hole of the plurality of cable hanger receptacle holes.

15. The method of claim 14, further comprising providing a plurality of cables, and receiving each cable through a respective cable hanger of the plurality of cable hangers.

16. The method of claim 15, further comprising providing a plurality of the cable hanger mounting plates fabricated from a metallic material, and providing a plurality of the cable hangers comprising polymeric feet for low-PIM attachment to the cable hanger mounting plates.

17. The method of claim 16, further comprising providing a plurality of the cable hangers comprising metallic feet, and providing a plurality of the cable hanger mounting plates fabricated from or coated with a polymeric material for low-PIM attachment to the cable-hanger mounting plates.

18. The method of claim 11, further comprising providing a plurality of channels wherein each channel comprises one of the cable hanger mounting plates.

19. The method of claim 18, wherein the channel comprises an end profile with a C shape, a Z shape, a U shape or a comb shape.

20. The method of claim 11, further comprising attaching a pair of the cable hanger mounting plates to a common pair of threaded rods.

* * * * *